United States Patent
Xu et al.

(10) Patent No.: US 10,374,966 B2
(45) Date of Patent: Aug. 6, 2019

(54) SCHEDULING PRIORITIZED TRAFFIC IN A SCRAMBLED CODED MULTIPLE ACCESS (SCMA) SYSTEM

(71) Applicant: Hughes Network Systems, LLC, Germantown, MD (US)

(72) Inventors: Jun Xu, Germantown, MD (US); Rob Torres, Germantown, MD (US); John Border, Germantown, MD (US); Zengquan Fan, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 68 days.

(21) Appl. No.: 15/140,889

(22) Filed: Apr. 28, 2016

(65) Prior Publication Data
US 2017/0317943 A1  Nov. 2, 2017

(51) Int. Cl.
*H04L 12/875* (2013.01)
*H04L 5/00* (2006.01)
*H04L 12/863* (2013.01)

(52) U.S. Cl.
CPC ............ *H04L 47/56* (2013.01); *H04L 5/0016* (2013.01); *H04L 5/0044* (2013.01); *H04L 5/0058* (2013.01); *H04L 47/6215* (2013.01)

(58) Field of Classification Search
CPC ....................................................... H04L 47/56
USPC ......................................................... 370/413
See application file for complete search history.

(56) References Cited

U.S. PATENT DOCUMENTS

| | | |
|---|---|---|
| 5,812,545 A | 9/1998 | Liebowitz et al. |
| 2001/0043575 A1 | 11/2001 | Kelly |
| 2004/0120273 A1 | 6/2004 | Border et al. |
| 2010/0098245 A1 | 4/2010 | Fang et al. |
| 2014/0201602 A1 | 7/2014 | Eroz et al. |

OTHER PUBLICATIONS

International Search Report in PCT/US17/30070, dated Jul. 27, 2017.

*Primary Examiner* — Samina F Choudhry
(74) *Attorney, Agent, or Firm* — Jones Robb, PLLC

(57) ABSTRACT

A system for scheduling prioritized traffic in a scrambled and coded multiple access (SCMA) system multiple terminals and a gateway. Each terminal is configured to receive packets from user devices and place the packets on various input queues. The packets are en-queued onto a plurality of output queues based on priority or service class. The terminal is further configured to detect one or more available SCMA slots within a frame of a communication system, and de-queue packets from the highest priority output queue onto the frame via one or more SCMA bursts. The terminal includes transceiver for transmitting/receiving frames of the communication system to/from the gateway. The terminals autonomously transmit SCMA bursts on a first channel, and transmit TDMA bursts on a second channel based on assigned timings received from the gateway.

20 Claims, 15 Drawing Sheets

| SCMA Slot | Start slot | End slot | SCMA Slot | Start slot | End slot |
|---|---|---|---|---|---|
| 1 | 18 | 47 | 14 | 408 | 437 |
| 2 | 48 | 77 | 15 | 438 | 467 |
| 3 | 78 | 107 | 16 | 468 | 497 |
| 4 | 108 | 137 | 17 | 498 | 527 |
| 5 | 138 | 167 | 18 | 528 | 557 |
| 6 | 168 | 197 | 19 | 558 | 587 |
| 7 | 198 | 227 | 20 | 588 | 617 |
| 8 | 228 | 257 | 21 | 618 | 647 |
| 9 | 258 | 287 | 22 | 648 | 677 |
| 10 | 288 | 317 | 23 | 678 | 707 |
| 11 | 318 | 347 | 24 | 708 | 737 |
| 12 | 348 | 377 | 25 | 738 | 767 |
| 13 | 378 | 407 | | | |
| | | | | | |
| Number of slots per frame (2Msps) | 768 (slot number 0~767) (120 symbols per slot) | | Number of slots per SCMA Burst | 30 | |
| Guard slots | 18 (0~17, at the front of a frame) | | Switching time (3ms) | 51.2 slots | |

SCHEDULING PRIORITIZED TRAFFIC IN A SCRAMBLED CODED MULTIPLE ACCESS (SCMA) SYSTEM

BACKGROUND INFORMATION

Communication systems typically employ various multiple access schemes in order to accommodate multiple users sharing a limited amount of bandwidth, while maintaining a certain amount of throughput. Some common multiple access schemes include Time Division Multiple Access (TDMA), Code Division Multiple Access (CDMA), Frequency Division Multiple Access (FDMA), etc. Satellite communication systems also use multiple access schemes to provide communication services (e.g., voice, data, etc.) to subscribers. Latency sensitive applications, however, can impose disadvantages for satellite communication systems because of the long round trip delay associated with transmission via geosynchronous satellites.

TDMA-based Satellite communication systems include a gateway which allocates bandwidth to individual terminals (i.e., satellite terminals) at a specific time and frequency on a satellite return channel (also referred to as the "inroute"). Bandwidth allocation is based on demand reported by the terminals. Due to the long round trip delay, however, the demand based bandwidth allocation method may not meet the delay requirement for latency sensitive traffic.

The TDMA based Aloha channel/RACH (Random Access Channel) can be used for control messages and latency sensitive traffic. For example, many systems transmit control messages on an Aloha/RACH channel, and transmit data (including voice) on a channel assigned based on demand or predictive use. Some systems also transmit a small high priority data on the Aloha/RACH channel. Since only one terminal can successfully transmit in the same time and frequency, collisions can occur when using the Aloha/RACH channel. Thus, bursts allocated to Aloha can only be used with an efficiency of about 10-15% with a certain acceptable collision rate, while regular TDMA achieves much higher efficiencies. Even if slotted Aloha is used, the maximum throughput is only about 36.8%, given 1:1 load density.

Scrambled Coded Multiple Access (SCMA) is an innovative technology that allows multiple users to simultaneously share a channel of the same frequency at the same time with much higher success rate. This is achieved, in part, by using a method of interference cancellation. In SCMA, for example, a physical (PHY) layer burst is heavily protected by a very low code rate (e.g., rate 1/9) and a strong Unique Word (UW) for burst identification. SCMA is discussed in greater detail in U.S. Pat. No. 8,683,292, entitled "Method and System for Providing Low Density Parity Check (LDPC) Coding For Scrambled Coded Multiple Access (SCMA)," and US Patent Application Publication No. 2014/0201602, entitled "Method and System for Providing Scrambled Coded Multiple Access (SCMA)," the contents of which are incorporated by reference.

SCMA can advantageously improve spectrum efficiency compared to Aloha TDMA, and also improve latency performance compared to regular stream TDMA. An SCMA channel could have 5.5 times or higher spectrum efficiency than a TDMA Aloha channel. Additionally, SCMA allows terminals to transmit autonomously without an explicit bandwidth allocation, thereby significantly improving the latency performance. Based on the foregoing, it would be advantageous to provide an approach for a satellite communication system which utilizes both SCMA and TDMA. SCMA can be used to transmit latency sensitive traffic, while assigned TDMA slots are assigned to terminals for high throughput traffic.

BRIEF SUMMARY

An apparatus, method, and system are disclosed for scheduling prioritized traffic in a scrambled and coded multiple access (SCMA) system. According to an embodiment, the apparatus includes a communication unit configured, in part, to receive packets from one or more user devices, and place the packets on a first input queue and/or a second input queue; an en-queueing unit configured to: determine a priority and/or service class for each packet, and en-queue the packets onto a plurality of output queues based, at least in part, on the determined priority and/or service class, wherein the plurality of output queues include at least a first output queue and a second output queue; a scheduling unit configured to detect one or more eligible SCMA slots within a frame of a communication system, and identify available SCMA slots, from the eligible SCMA slots, that are useable for transmitting data; a de-queueing unit configured to de-queue packets from the first output queue onto the frame via one or more SCMA bursts encompassing at least one available SCMA slot and/or via at least a portion of a TDMA burst assigned to the apparatus; and a transceiver for transmitting and receiving frames of the communication system, wherein the SCMA burst and TDMA burst are transmitted on different channel frequencies.

According to another embodiment, the method includes receiving packets, from one or more user devices, at a terminal; placing the packets on a first input queue and/or a second input queue; determining a priority and/or service class for each packet; en-queueing the packets onto a plurality of output queues including at least a first output queue and a second output queue based, at least in part, on the determined priority and/or service class; detecting one or more eligible SCMA slots within a frame of a communication system; identifying available SCMA slots, from the eligible SCMA slots, that are useable for transmitting data; and de-queueing packets from the first output queue onto the frame via one or more SCMA bursts encompassing at least one available SCMA slot and/or via at least a portion of a TDMA burst assigned to the terminal, wherein the SCMA burst and TDMA burst are transmitted on different channel frequencies.

According to another embodiment, the system includes one or more terminals, each terminal comprising: a communication unit configured, in part, to receive packets from one or more user devices, and place the packets on a first input queue and/or a second input queue, an en-queueing unit configured to: determine a priority for each packet, and en-queue the packets onto a plurality of output queues based, at least in part, on the determined priorities, wherein the plurality of output queues includes at least a first output queue and a second output queue, a scheduling unit configured to detect one or more eligible SCMA slots within a frame of a communication system, and identify available SCMA slots, from the eligible SCMA slots, that are useable for transmitting data, a de-queueing unit configured to de-queue packets from the first output queue onto the frame via one or more SCMA bursts encompassing at least one available SCMA slot and/or via at least a portion of a TDMA burst assigned to the terminal, and a transceiver for transmitting and receiving frames of the communication system; and a gateway configured to transmit/receive frames to/from the one or more terminals, and to broadcast congestion feedback to the one or more terminals, wherein the SCMA burst and TDMA burst are transmitted on different channel frequencies, wherein TDMA bursts are assigned to the one or more terminals based, at least in part, on current demand, and wherein each terminal autonomously transmits its SCMA bursts.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and system for scheduling prioritized traffic in a scrambled and coded multiple access (SCMA) system, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
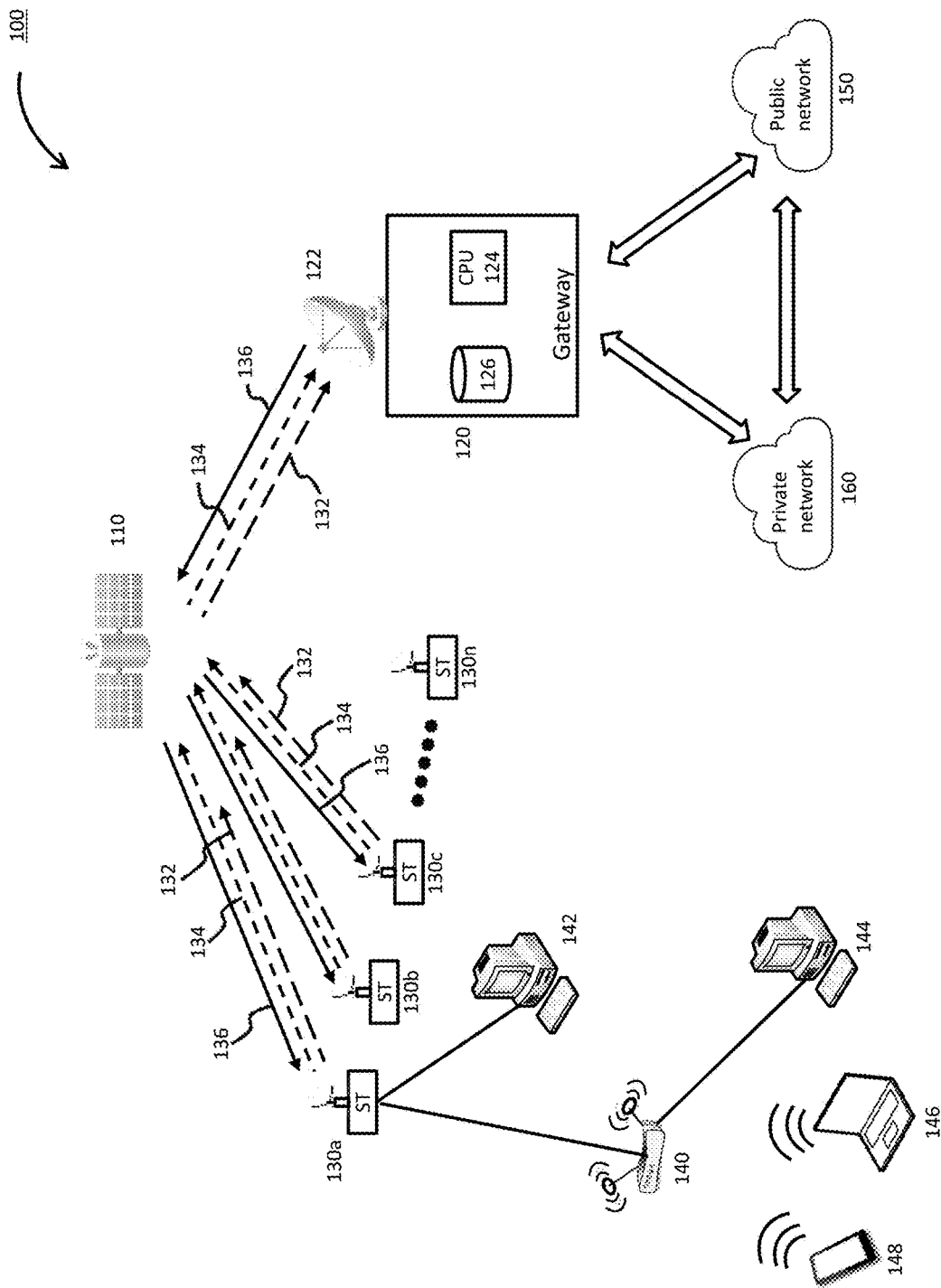
FIG. 1 is a diagram of a system capable of scheduling prioritized traffic in an SCMA system, according to one embodiment.

FIG. 1 is illustrates a system capable of scheduling prioritized traffic in an SCMA system, according to an embodiment. The system 100 illustrates communication between various types of networks including, for example, a satellite network, a private network, and a public network. According to the illustrated embodiment, a gateway 120 and satellite 110 are provided to facilitate communication between various CPEs (142-148), via the satellite terminals 130a-130n (collectively 130), and external networks. The external networks can include, for example, a public network 150 (e.g., the Internet) or a private network 160. While FIG. 1 shows a single gateway 120, it should be appreciated that additional gateways may be provided at different points within the system 100. For example, the public network 150 and the private network 160 can include one or more gateways that are internally managed.

In order to exchange information with the satellite 110, the gateway 120 can include a transceiver 122 which transmits/receives information to/from the satellite 110. A plurality of satellite terminals 130a-130n (or simply terminals) can be provided for communicating with the gateway 120 along a bent pipe path facilitated by the satellite 110. The satellite terminals 130 (or terminal) can be, for example, in the form of very small aperture terminals (VSAT) capable of transmitting/receiving information to/from the satellite 110.

According to the illustrated embodiment, each satellite terminal 130 can be connected to one or more CPEs (142-148). The CPEs (142-148) can be in the form of various user devices capable of network communication using wired or wireless techniques. As illustrated in FIG. 1, for example, satellite terminal 130a has a wired connection to a router 140 and a personal computer 142. The router 140 can be further configured with both wired and wireless capabilities. For example, the router 140 has wired connections to another personal computer 144. The router 140 also has wireless connections to a laptop 146, and a tablet 148. According to various embodiments, wired communication can be achieved using physical Ethernet cables, USB cables, etc. Additionally, wireless communication can be achieved via standard wireless methods such as 802.11a/b/g/n/AC, Bluetooth, etc. The CPEs (142-148) can establish connections with the public network 150 and/or the private network system 160 (using appropriate security protocols) in order to exchange information with various devices.

FIG. 1 illustrates an embodiment wherein multiple terminals 130 share a first channel 132, such as a scrambled and coded multiple access (SCMA) inroute channel. As will be discussed in greater detail below, the terminals 130 can use SCMA transmission opportunities autonomously without knowledge as to whether other terminals 130 are using a same SCMA transmission opportunity. The terminals 130 are also capable of using a second channel 134, such as a time division multiple access (TDMA) channel, to transmit using TDMA bursts specifically assigned to each terminal by the gateway 120. Once the TDMA bursts are assigned, each terminal 130 will transmit in accordance with its assigned TDMA burst. Thus, there are no overlapping TDMA bursts transmitted by different terminals 130.

When physical layer (i.e., PHY) bursts from different terminals 130 arrive during the same SCMA transmission opportunity, the gateway 120 is still able to decode the information from each terminal 130 by methods of interference cancellation. Depending on the number of terminals 130 utilizing the same SCMA transmission opportunity, some or all of the information transmitted by the terminals 130 may not be correctly decoded. Such a situation can occur, for example, if the number of overlapped transmissions (or bursts) in the same SCMA transmission opportunity exceeds a predetermined limit. An erroneous SCMA burst can possibly cause failure of an upper layer packet, and further which may ultimately necessitate upper layer retransmission for a transmission control protocol (TCP) packet.

According to at least one embodiment, a feedback congestion control scheme can be applied to control usage of the SCMA (or first) channel 132. For example, an operating probability can be introduced to represent the probability that a terminal 130 uses its SCMA transmission opportunities. At the gateway transceiver 122, the SCMA burst error rate (BurstER) can be measured. If the BurstER is high, the operating probability is reduced. Conversely, if the BurstER is low, the operating probability is increased.

Next, the gateway 120 broadcasts the operating probability to all the terminals 130. According to various embodiments, each terminal 130 can have a certain amount of SCMA transmission opportunities, namely SCMA slots (discussed in greater detail below). Each terminal 130 applies the received operating probability to determine the number of SCMA transmission opportunities that it will actually use. If the operating probability is high, for example, the terminal 130 can use more SCMA transmission opportunities. If the operating probability is low, the terminal 130 can use fewer SCMA transmission opportunities. By continuously monitoring the BurstER, the gateway 120 can dynamically generate congestion control information 136 that is broadcast to all terminals 130 in order control the use of SCMA transmission opportunities and reduce the risk of exceeding the limit of overlapped transmissions. As previously discussed, excessive overlapped transmissions can result in the need to retransmit TCP packets.

Figure 2:
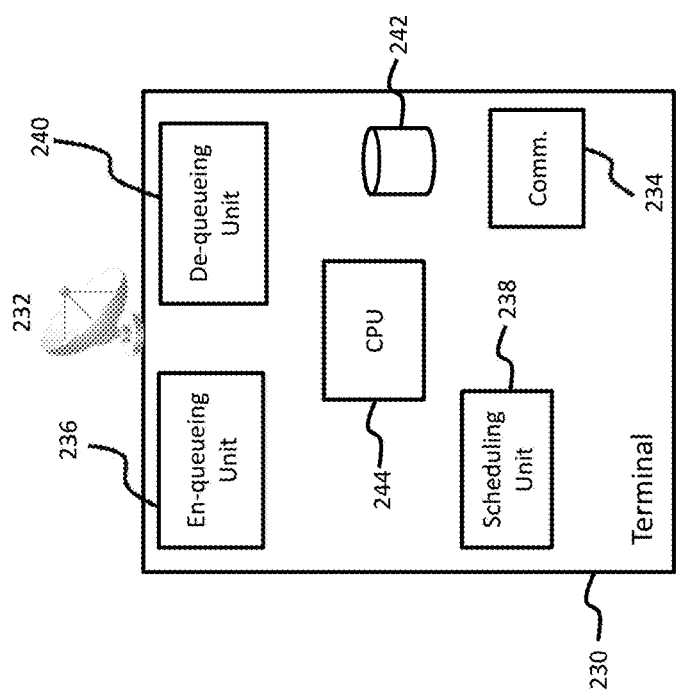
FIG. 2 is a diagram of a terminal used in the system of FIG. 1, according to one embodiment.

FIG. 2 a diagram illustrating details of the terminal 230 used in the system of FIG. 1, according to one or more embodiments. The terminal 230 includes a transceiver 232, a communication unit 234, an en-queueing unit 236, a scheduling unit 238, a de-queueing unit 240, a storage unit 242, and a CPU. The transceiver 232 can be used to transmit and receive information to and from the gateway 120 via the satellite 110. Depending on the specific embodiment, the transceiver 232 can be remotely located, or separate, from the terminal 230. The communication unit 234 is configured to transmit/receive information to/from the various user devices (142-148). According to at least one embodiment, the communication unit 234 can establish wired and/or wireless connections with the various user devices (142-148). Thus, the communication unit 234 can include one or more network interface controllers (NICs) for wired connections, and/or a wireless networking transceiver for wireless connections (e.g., 802.11a/b/g/n/ac). The communication unit 234 can also include one or more universal serial bus (USB) ports capable of being used for wired network connections as well as attached storage device connections.

The en-queueing unit 236 is used to process packets (or data packets) received from the user terminal 230. As will be discussed in greater detail below, the en-queueing unit 236 can be configured to analyze the packets received from the various user devices and place them into various output queues having different priorities. The scheduling unit 238 examines the status of the various output queues, as well as the available capacity of frames that will be transmitted to the gateway 120. Depending on available capacity and the type of transmission opportunities available (SCMA, TDMA, or both), the scheduling unit 238 determines the manner in which information contained in the packets will be arranged within the frame. The de-queueing unit 240 is configured to arrange packets from the various output queues onto the frame so that they can be transmitted to the gateway 120.

According to various embodiments, the de-queueing unit 240 can be configured to perform one or more of the operations normally assigned to the scheduling unit 238. Furthermore, the de-queueing unit 240 and/or the scheduling unit 238 can be configured to allocate a predetermined amount of time required to change frequencies between different transmission opportunities. The terminal 230 also includes a storage unit 242 that can be used to store various information required for operation of the terminal 230. According to various embodiments, the storage unit 242 can include components for permanently retaining information, as well as a volatile memory for temporarily retaining information (e.g., cache memory). The CPU 244 can be configured to manage various operations of the terminal 230. Depending on the specific embodiment, the CPU 244 can be also configured to perform tasks associated with one or more components illustrated in FIG. 2. For example, in addition to managing various operations of the terminal 230, the CPU 244 can be configured to perform all tasks associated with the en-queueing unit 236, the scheduling unit 238, and/or the de-queueing unit 240.

Figures 3, 4:
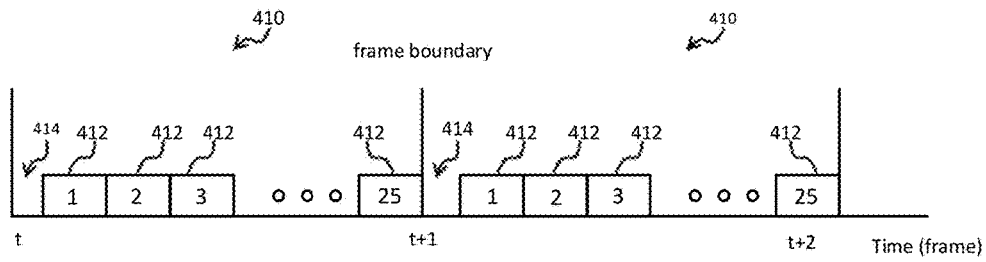
FIG. 3 is a table illustrating the content of a frame, according to at least one embodiment.
FIG. 4 is a diagram illustrating arrangement of burst apertures in a frame, according to an embodiment.

FIG. 3 is a table illustrating the content of a frame, according to an exemplary embodiment. For purposes of illustration, the contents of the frame are described with respect to an SCMA channel (or first channel) based on a 2 Msps inroute. Each frame is selected to be 45 ms. It should be noted that other implementations can apply different lengths to the frame (e.g., 35 ms, 40 ms, 50 ms, 55 ms, etc.). As used herein, a frame corresponds to an entire link layer (i.e., MAC layer) frame to be transmitted in the satellite communication network.

For a 2 Msps inroute, there are totally 768 inroute slots (0-767) per 45 ms frame, with each inroute slot containing 120 symbols. The start and end times of each inroute slot within the 45 ms frame are fixed. The frame is capable of accomodating 25 SCMA burst apertures that are 30 inroute slots in length. Thus, the 25 SCMA burst apertures occupy 750 of the 768 inroute slots contained in the frame. Each SCMA burst aperture is capable of carrying 78 bytes of data, excluding any overhead. A frame composed entirely of SCMA burst apertures (i.e., 25 burst apertures), for example, would be capable of carrying 1950 bytes. The remaining 18 inroute slots within the frame are guard slots and not used to carry data. According to the illustrated embodiment, the guard slots are maintained in a contiguous manner, and placed at the beginning (i.e., inroute slots 0-17) of the frame. According to other embodiments, however, the guard slots can be placed at the end (i.e., inroute slots 750-767) of the frame. According to still further embodiments, the guard slots can be divided into equal and/or unequal portions and placed at both the beginning and end of the frame (e.g., inroute slots 0-8 and 759-767).

FIG. 3 further illustrates SCMA slots numbered 1-25. As used herein, an SCMA slot corresponds to the inroute slot location at which an SCMA burst aperture begins. For example, SCMA slot 1 is located at inroute slot 18 within the frame. The first SCMA burst aperture would, therefore, begin at inroute slot 18. The first SCMA burst aperture would also terminate at inroute slot 47, thereby occupying 30 total inroute slots. Similarly, the second SCMA burst aperture would begin at inroute slot 48 and terminate at inroute slot 77. Additionally, an SCMA burst corresponds to de-queued SCMA data. SCMA bursts can be measured in terms of SCMA slots and/or SCMA burst apertures. For example, an SCMA burst encompassing three SCMA slots or three SCMA burst apertures both refer to an SCMA burst which occupies 90 inroute slots in the frame. According to one or more embodiments, frequency changes may be required depending on the specific transmission opportunities available within a given frame. In one embodiment, the amount of time required to switch between frequencies is 3 ms. This corresponds to 51.2 inroute slots in length, or approximately 52 inroute slots.

FIG. 4 illustrates the arrangement of SCMA bursts 412 in a frame 410, according to an embodiment. The exemplary frame 410 only contains SCMA bursts 412, and is capable of accommodating a total of 25. According to other embodiments, however, the frame 410 may further include one or more TDMA bursts (discussed in greater detail below) which can affect the total number, and location, of SCMA bursts 412. As further illustrated in FIG. 4, the frames 410 also include guard slots 414 that have been positioned at the beginning of each frame 410.

According to various embodiments, a unique word (UW) can be used to identify the SCMA burst of each terminal at a given SCMA slot, thereby ensuring that the gateway can successfully identify them even under conditions where multiple SCMA bursts (from different terminals) collide with each other. The missed or false detection rate of an SCMA burst is considered significantly small (less than 1E-4) compared to the operating error rate (e.g., 1E-3) under normal condition. For example, under normal operating condition, a random access channel is configured such that the (uncontrolled) missed or false detection rate is sufficiently small (compared to 1E-3). When setting error rate target=1E-3, the measured error rate can reflect the true error rate with a high level of confidence. An SCMA burst is also encoded with very low code rate (i.e., rate 1/9) so that it can be successfully received even under harsh channel conditions.

Figure 5:
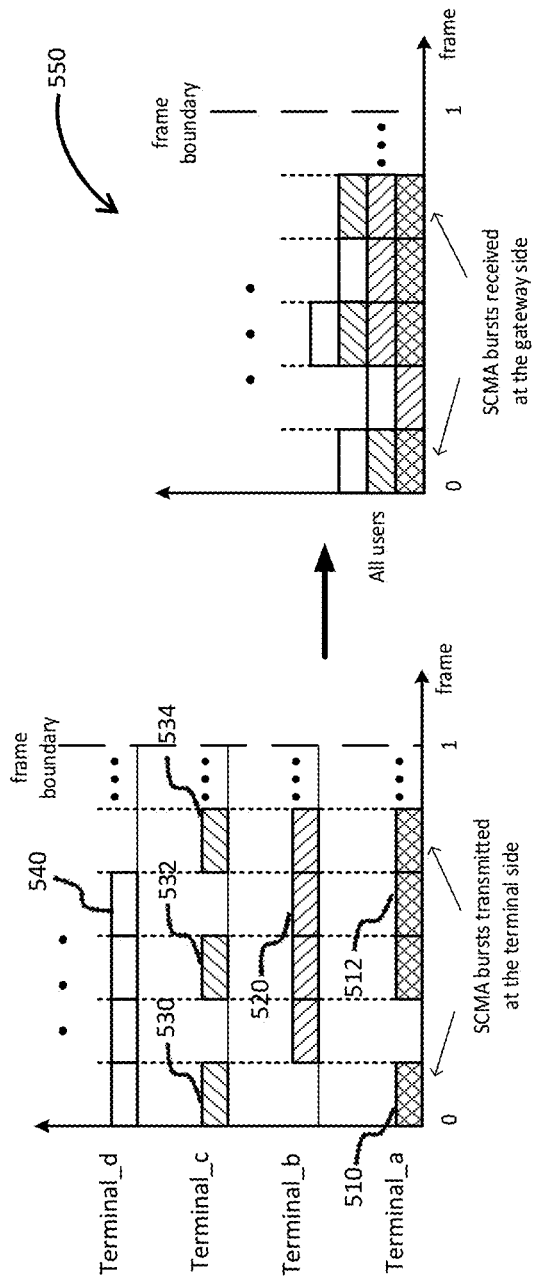
FIG. 5 is a diagram illustrating transmission of autonomous SCMA bursts by multiple terminals and reception, according to one or more embodiments.

FIG. 5 illustrates transmission of autonomous SCMA bursts on the SCMA inroute channel by multiple terminals and their aggregate arrival at the gateway, according to an embodiment. Terminal_a transmits a first SCMA burst 510 which starts at the first SCMA slot and occupies one SCMA burst aperture (i.e., 30 inroute slots). Terminal_a also transmits a second SCMA burst 512 which starts at the third SCMA slot and occupies three SCMA burst apertures (i.e., 90 inroute slots). Terminal_b transmits one SCMA burst 520 which starts at the second SCMA slot and occupies four SCMA burst apertures. Terminal_c transmits a first SCMA burst 530 which starts at the first SCMA slot, a second SCMA burst 532 which starts at the third SCMA slot, and a third SCMA burst 534 which starts at the fifth SCMA slot. Each of the three SCMA bursts (530, 532, 534) occupy a single SCMA burst aperture. Terminal_d transmits a single SCMA burst 530 which starts at the first SCMA slot and occupies four SCMA burst apertures.

Since the terminals transmit autonomously, none are aware of other terminals that may be transmitting SCMA bursts during the same SCMA slot. Accordingly, the number of overlapped SCMA bursts 550 at each SCMA slot may vary. As illustrated in FIG. 5, for example, the third SCMA slot contains overlapped SCMA burst apertures from each of the four terminals, the second SCMA slot contains only contains two (2) overlapped SCMA burst apertures. As can be appreciated, the higher the traffic density, the higher the chance of a large number of overlaps in a given SCMA slot.

Table 1 shows the burst error rate in terms of number of overlaps and average received signal to noise ratio (Es/No) based on experiments with specific parameter settings. Given a target Es/No, it can be seen that the burst error rate increases with the number of overlaps.

TABLE 1

| | SCMA Burst Error Rate | | | |
|---|---|---|---|---|
| Overlapped | Target Es/No | | | |
| users | 0 (dB) | 1 (dB) | 2 (dB) | 3 (dB) |
| 2 | 0.003993 | 0.000189 | 1.11E-05 | 3.25E-06 |
| 3 | 0.005344 | 0.000304 | 3.47E-05 | 1.68E-05 |
| 4 | 0.006598 | 0.000429 | 6.67E-05 | 4.10E-05 |
| 5 | 0.007187 | 0.000573 | 9.01E-05 | 5.26E-05 |
| 6 | 0.009072 | 0.000704 | 0.000113 | 8.09E-05 |
| 7 | 0.011006 | 0.000934 | 0.000141 | 8.85E-05 |
| 8 | 0.012877 | 0.001244 | 0.000185 | 0.000109 |
| 9 | 0.017153 | 0.001597 | 0.000242 | 0.00013 |
| 10 | 0.019675 | 0.001956 | 0.000304 | 0.000153 |
| 11 | 0.024368 | 0.002904 | 0.000425 | 0.000146 |
| 12 | 0.027441 | 0.003388 | 0.000719 | 0.000266 |
| 13 | 0.050359 | 0.005358 | 0.001188 | 0.000611 |
| 14 | 1 | 0.840336 | 0.541005 | 0.200985 |
| 15 | 1 | 1 | 1 | 1 |

When the number of overlaps reaches 15, all received SCMA bursts are collapsed regardless of the Es/No. According to an embodiment, the BurstER is also dependent on the received Es/No. For example, when the number of overlaps is 7, the BurstER is 1.1E-2 and 1.4E-4 for average Es/No 0 dB and 2 dB, respectively. Additionally, according to various embodiments the number of detected bursts and the number of successfully decoded bursts at each 45 ms frame are known to the physical layer and can be conveyed to the link layer. Accordingly, it becomes possible for the gateway to calculate the burst error rate based on the number of SCMA bursts detected and the number of successfully decoded.

For example, let $T_w$ be the window size to calculate BurstER. Let $N_{det}$ and $N_{suc}$ be the number of detected and the number of successfully decoded bursts in past $T_w$ frames. The BurstER at any time t can be determined as:

$$BurstER(t) = \frac{N_{det} - N_{suc}}{N_{det}}, N_{det} \neq 0,$$

where t is measured in terms of frames. When there are no SCMA bursts detected, possible sources of problems can include: (1) no SCMA bursts transmitted, (2) too many SCMA bursts arriving, (3) component failure, etc. If too many SCMA bursts collapse, a terminal would receive many NACKs and responsively reduce using or turn off SCMA transmissions altogether. It is reasonable to just carry over the BurstER from previous frame, i.e., If $N_{det}=0$, then BurstER(t)=BurstER(t−1).

Under normal conditions, however, both the missed detection and false detection rates are considered to be significantly small compared to the targeted burst error rate (e.g., the targeted BurstER=1E-3).

Figure 6:
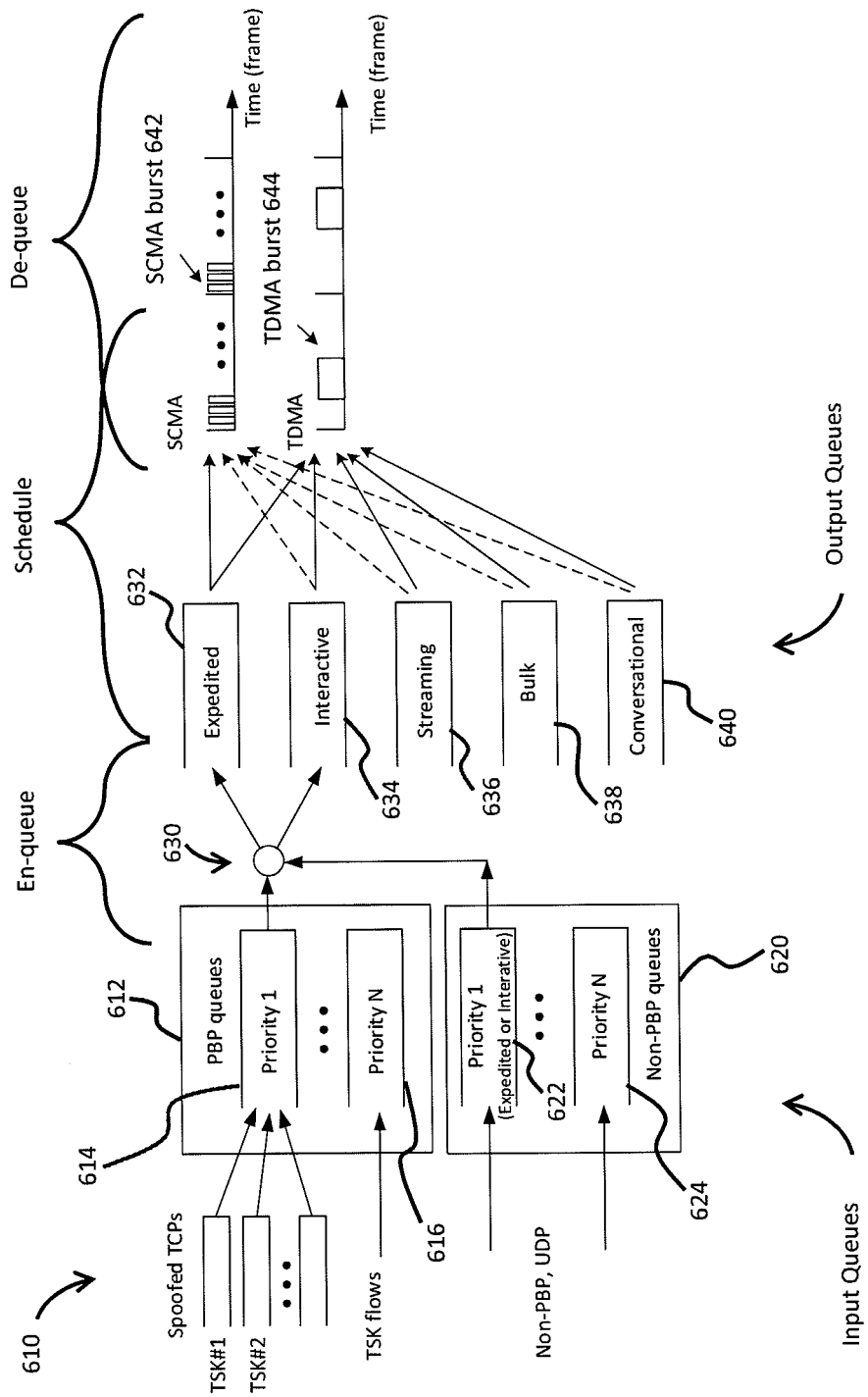
FIG. 6 is a diagram illustrating the upper layer queueing structure at the terminal, according to various embodiments.

FIG. 6 is a diagram illustrating the upper layer queueing structure at the terminal, according to various embodiments.

The communication unit 234 receives various types of packets 610 from the user devices (142-148). The received packets 610 can be in the form of spoofed TCP packets, TSK (TCP Spoofing Kernel) flows, non-PBP (PEP (Performance Enhancing Proxy) Backbone Protocol) packets, and UDP packets. The received packets 610 are placed on either a first input queue 612 or a second input queue 620. According to various embodiments, the received packets 610 can be placed on the first input queue 612 or the second input queue 620 based on the particular service class. For example, spoofed TCP packets and TSK flows can be assigned specific service classes that facilitate placement on the first input queue 612. Additionally, non-PBP and UDP packets can be assigned service classes which facilitate placement on the second input queue 620. The use of priorities and service classes should, therefore, only be considered as illustrative for ranking, sorting, and/or prioritizing received packets. The first input queue 612 can be configured to incorporate one or more sub-queues (or PBP queues) having different priorities, such as priority 1 sub-queue 614 and priority N sub-queue 616. Similarly, the second input queue 620 can include a priority 1 sub-queue 622 up to a priority N sub-queue 624. As illustrated in FIG. 6, the sub-queues of the second input queue 620 are configured to store non-PBP packets 610.

According to an embodiment, the packets 610 of high priority spoofed TCP traffic are classified to the PBP Priority 1 queue 614. Other high priority packets, such as those of unspoofed TCP or UDP, are classified into a Layer 3 queue, namely the non-PBP Priority 1 queue 622. According to at least one embodiment, the communication unit 234 can be configured to place the received packets 610 on the first input queue 612 and second input queue 620. According to other embodiments, the CPU 244 can be configured to perform this function.

As illustrated in FIG. 6, a decision point (DP) 630 is used to en-queue layer-3 packets from the first input queue 612 and the second input queue 620 onto a plurality of output queues. The decision point 630 can be part of, or incorporated within, the en-queueing unit 236, depending on the specific implementation. As used herein, the term "en-queue" corresponds to adaptive placement of packets onto a particular queue (e.g., the plurality of output queues). According to at least one embodiment, the output queues can include an expedited queue 632, an interactive queue 634, a streaming queue 636, a bulk queue 638, and a conversational queue 640. It should be noted, however, that additional output queues may be used, depending on the specific implementation. During transmission, the packets in PBP or non-PBP priority 1 queues (614, 622) are de-queued to either the expedited queue 632 or the interactive queue 634 at the link layer.

The decision point 630 is configured to determine, for example, whether to place Layer 3 high priority PBP 614 or non-PBP priority 1 622 packets to the expedited queue 632 or to the interactive queue 634. According to various embodiments, the decision point 630 en-queues (or places) packets on the expedited (or first) queue 632 based various criteria, including: channel condition, SCMA unacknowledged (NACK) rate, expedited queue size, burst error, availability of the SCMA channel, etc. The channel condition corresponds to the condition where the terminal's channel estimation (or link budget) indicates that the channel is not qualified for using SCMA. Under such circumstances, the decision point 630 will stop placing packets to the expedited queue 632.

The SCMA NACK rate corresponds to a condition where the rate of unacknowledged packets for the terminal over a predetermined period of time exceeds a threshold value. If the SCMA NACK rate exceeds a threshold value, the decision point 630 stops placing packets on the expedited queue 632. The threshold value can be selected based on specific needs of a particular implementation. According to an embodiment, the period for evaluating the NACK rate of SCMA packets ($T_{NACK}$) can be set to 16 frames, the duration of not placing packets in expedited queue ($T_{NACK-OFF}$) can be set to 80 frames, and the threshold of NACK rate ($R_{NACK-TH}$) can be set to 20%. If the SCMA NACK rate over $T_{NACK}$ is larger than $R_{NACK-TH}$, then the decision point will stop placing packets on the expedited queue 632 for the duration specified by $T_{NACK-OFF}$ (i.e., 80 frames).

According to an embodiment, the criteria of the expedited queue size is based, at least in part, on an active queue size management using the measured or expected delay. For example, let $D_{Tar,Expd}$ be the delay target of the expedited queue 632, and $D_{Expd}$ be the measured average delay of packets in the expedited queue 632. The delay of a packet in the expedited queue 632 can be considered as the duration from the moment when the packet is placed in the queue to the time of the start of sending via SCMA or TDMA channel (in this way the packet size does not count into the delay). Let the period for measuring packet delay be $\Delta t$ (for example, $\Delta t$=45 ms). Let $N_t$ be the number of packets being served by SCMA or TDMA during the period of t−$\Delta t$ to t, where t is the time marker and can be a multiple of the 45 ms frame. In this specific implementation, the interval is recommended as 1 frame.

Average delay at time t can be calculated as:

$$d_{avg}(t) = \sum_{i=1}^{N_t} d_i / N_t.$$

where $d_i$ is the measured delay for packet i.
The average delay of the expedited queue 632 is further smoothed by:

$$D_{Expd}(t) = \alpha \cdot d_{avg}(1-\alpha) \cdot D_{Expd}(t-1), 0 < \alpha \leq 1.$$

When t=1, $D_{expd}(t) = d_{avg}(t)$. Determining α is based on the frequency at which Layer 3 packets (from first input queue 612 and second input queue 620) are pushed into Layer 2 queues (output queues 632-640). Let $\Delta T$ be the period of Layer 3 to Layer 2 pushing. Then m=$\Delta T/\Delta t$, α is chosen by $$\alpha = \frac{2}{m+1}.$$

Thus, if $\Delta T=\Delta t=45$ ms, then α=1. $\Delta T$ and $\Delta t$ are parameters at Layer 3 and Layer 2, respectively. According to an embodiment both parameters can be fixed, thereby allowing α can be a pre-determined and configurable value.

When the burst error rate is unacceptably high, the decision point 630 will stop placing packets in the expedited queue 632 until the BurstER falls below a predetermined threshold. According to one or more embodiments, the gateway can control whether or not the terminals are allowed to use the SCMA channel. The determination can be made at the gateway based on global network parameters and conditions being observed for all the terminals. Thus, if the gateway indicates that the SCMA channel is off, then no data is placed in the expedited queue 632 by any terminal. When the gateway indicates that the SCMA channel is on, the terminals can proceed to autonomously use the SCMA channel.

According to the illustrated embodiment, when the en-queue conditions are satisfied, packets in PBP and non-PBP priority 1 queues (614, 622) are pushed into the expedited queue 632 by the decision point 630. Feeding packets into the expedited queue 632 can be performed based, in part, on packet type and packet size. The terminal is therefore capable of using information received from the gateway (e.g., burst error rate, operating probability, etc.) together with packet size and packet type (e.g., PBP or non-PBP) when en-queueing the expedited queue 632.

According to one or more embodiments, the SCMA channel is used exclusively for packets in the expedited queue 632 (solid line), with the exception of those going-active packets in the interactive queue 634, streaming queue 636, bulk queue 638, and conversational queue 640 (dashed lines). Only one SCMA burst's worth of data may be pulled from non-Expedited queues to go active. The expedited queue can receive PBP and non-PBP priority 1 packets, but may not receive all of them. These packets can also feed the existing interactive queue 634. Packets that have been placed in the expedited queue 632 will be sent either on SCMA or TDMA.

At the terminal, transmission opportunities on TDMA and SCMA must first be scheduled (i.e., by the scheduling unit), and then the de-queueing unit determines how to fill data of different priority queues in the scheduled transmission opportunities. As illustrated in FIG. 6, multiple SCMA slots 642 can be grouped to define SCMA burst apertures on the SCMA channel, while the TDMA channel contains TDMA bursts 644 specifically assigned to the terminal by the gateway. In contrast to the SCMA slots that can be used autonomously by the terminals with overlap, the TDMA bursts are fixed for each terminal and are not allowed to overlap. According to at least one embodiment, methods of scheduling and de-queueing on TDMA can be based on configured weights. Furthermore, scheduling for TDMA can be done about half a frame ahead of de-queueing, while de-queueing is executed in-frame.

According to at least one embodiment, when a terminal is not active (i.e., no current TDMA assignment), the terminal is allowed to send at least one SCMA burst as long as the link conditions permit. If the terminal is idle and has data in the expedited queue 632, the terminal uses the expedited data to create a group burst (i.e. an IBE) with one or multiple SCMA bursts subject to scheduled SCMA Slots and the expedited data amount, including backlog from other queues if there is space in the very last SCMA burst. If the terminal is idle and has no data in the expedited queue 632, the terminal pulls enough bytes from the highest possible priority queue to fill a group burst of one SCMA slot (or SCMA burst aperture).

Table 2 illustrates exemplary values for packet size for going-active (Aloha), according to an embodiment. Given the burst error rate and operating probability, the scheduler is able to provide the scheduled SCMA slots for the de-queueing unit. If there is no information on scheduled SCMA slots, the de-queueing unit uses one SCMA slot for going-active.

TABLE 2

Parameters of Expedited En-queue Operation

| Index i (i) | Burst ER_TH (i), i is the index | PBP Packet size(i) (bytes) (up to) | Non-PBP Packet size(i) (bytes) (up to) | Going-active packet size in L2 queue (up to) | Expedited En-queue Operation | Comment | Limit of Group Burst Size |
|---|---|---|---|---|---|---|---|
| 1 | 0.001 | any | any | any | When the BurstER <= BurstER_TH(1), en-queue any packet size and type. | | $I_{max\text{-}GBS}$ (22) |
| 2 | 0.003 | 7*78 | any | any | If BurstER_TH(1) < BurstER <= BurstER_TH(2), en-queue PBP packets no more than PBP Packet Size(2) and any Non-PBP packet size. If seeing a PBP packet larger than this size, stop placing PBP packets in the Expedited queue for $T_{PBP\text{-}OFF}$ (frames). | $T_{PBP\text{-}OFF}$ = 32 frames by default, or it is an Exponential RV with mean = 32. | 7 |
| 3 | 0.005 | 0 | 10*78 | 10*78 | If BurstER_TH(2) < BurstER <= BurstER_TH(3), en-queue Non-PBP packet size no more than Non-PBP Packet Size(3). | | 5 |

TABLE 2-continued

Parameters of Expedited En-queue Operation

| Burst ER_TH (i), Index i is the index (i) | PBP Packet size(i) (bytes) (up to) | Non-PBP Packet size(i) (bytes) (up to) | Going-active packet size in L2 queue (up to) | Expedited En-queue Operation | Comment | Limit of Group Burst Size |
|---|---|---|---|---|---|---|
| 4  0.01 | 0 | 5*78 | 5*78 | If BurstER_TH(3) < BurstER <= BurstER_TH(4), en-queue Non-PBP packet size no more than Non-PBP Packet Size(4). | | 5 |
| 5  0.05 | 0 | 2*78 | 2*78 | If BurstER_TH(4) < BurstER <= BurstER_TH(5), en-queue Non-PBP packet size no more than Non-PBP Packet Size(5). | | 3 |
| 6  0.20 (Burst ER_non-Expd) | 0 | 2*78 | 2*78 | If BurstER_TH(5) < BurstER <= BurstER_TH(6), en-queue Non-PBP packet size no more than Non-PBP Packet Size(6). | Depending on how worse the overall network congestion, Aloha, etc., as 10% packet error rate may be still OK for Aloha. | 2 |
| 7  Higher than Burst ER_non-Expd | 0 | 0 | 1*78 | Not any PBP or Non-PBP packets for the Expedited queue. | | 1 |

Comment: for a going-active packet, multiple SCMA bursts can be used for the Expedited queue, but only one burst's worth of data can be from other queues.

Table 2 lists the group burst size in terms of BurstER, denoted as Group Burst Size Limit (GBSL). The values of group burst size implies that they are related to the packet size for en-queueing. The intuition is that the group burst size can fit the largest PBP packet in the expedited queue. For example, reading Table 2:

if BurstER<BurstER_TH(1) (0.001), GBSL=$I_{max-GBS}$ (configurable, $I_{max-GBS} \leq 25$);

if BurstER is in between BurstER_TH(1) and BurstER_TH(2), GBSL=7;

. . . .

If BurstER is in between BurstER_TH(6) and BurstER_TH(7), GBSL=2;

If BurstER is larger than BurstER_TH(7), GBSL=1.

In addition, the group burst size should be adaptive to the observed payload at the scheduling time. To this end, the de-queueing unit would fulfill an entire group burst as long as there is some data in the expedited queue. If there is insufficient data, paddings are used. This would generate unnecessary payload, resulting in potential interference to other terminals. Thus the scheduling unit needs to evaluate payload size when preparing a group burst. Further, the actual group burst size may also be subject to the number of available SCMA slots and the number of consecutive SCMA slots to be grouped.

Figure 7:
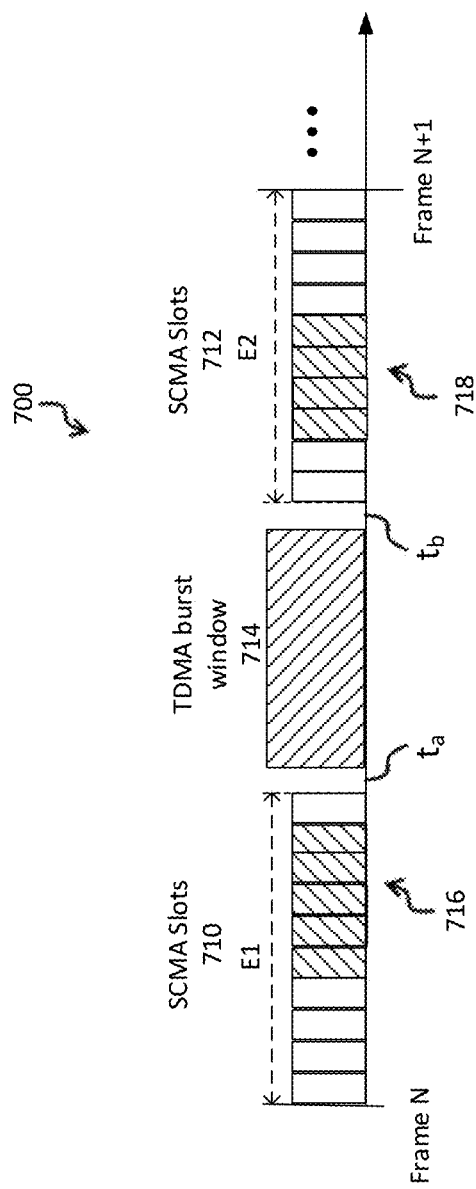
FIG. 7 is a diagram illustrating SCMA and TDMA transmission opportunities in one frame, according to at least one embodiment.

FIG. 7 is a diagram illustrating SCMA and TDMA transmission opportunities in one frame 700, according to at least one embodiment. The frame 700 contains a first group of SCMA slots 710 designated by E1, and a second group of SCMA slots 712 designated by E2. FIG. 7 also illustrates a TDMA burst 714 which has been assigned to the terminal. As previously discussed, TDMA bursts 714 are assigned to each terminal by the gateway, for example, as part of a burst schedule. Thus, each terminal is assigned a specific TDMA burst 714 in order to fill the entire frame on the TDMA channel. Time lines $t_a$ and $t_b$ represent the boundary for tuning in and out of the TDMA channel frequency. Accordingly, the eligible SCMA slots for frame N correspond to those before $t_a$ and after $t_b$. The total number of eligible SCMA slots is E1+E2. The first group of SCMA slots 710 contains a subset of available SCMA slots 716 that can be used for carrying data. The second group of SCMA slots 718 also includes available SCMA slots 718 that can be used to carry data.

According to the illustrated embodiment, the gap for switching between TDMA and SCMA frequencies is 3 ms, or 51.2 inroute slots. Thus, 52 inroute slots are allocated for frequency switching. Accordingly, the starting inroute slot of an eligible SCMA slot must be 52 inroute slots after a TDMA burst, and the ending inroute slot of an eligible SCMA slot must be 52 inroute slots before a TDMA burst. Once the terminal is assigned its TDMA burst, the location of eligible SCMA slots within the frame can be determined since the SCMA slot locations are also fixed.

According to an exemplary embodiment, the number of eligible SCMA slots in a frame ($E_{eligible}$), subject to the number of TDMA bursts in the current frame (Frame N) and the location of TDMA bursts in the next frame (Frame #N+1), can be defined as:

$$E_{eligible} = E1 + E2$$

The scheduling unit is configured to determine the number and location of eligible SCMA slots based on the location of TDMA burst(s). The scheduling unit begins to schedule SCMA slots for frame N about half a frame in advance. Further, the scheduling unit may need to look ahead into frame N+1 to determine whether a TDMA burst at the beginning of frame N+1 would block an SCMA slot at the end of frame N. If the duration of an SCMA burst aperture is denoted as $T_{Burst}$ in terms of inroute slots and assigned a value of 30, then $2*(T_{Burst})$ inroute slots are necessary to prevent blocking the TDMA burst when a 3 ms frequency switching time is required.

According to at least one embodiment, a vector can be used to represent the location of eligible SCMA slots. For example, if there is no TDMA burst at the beginning of frame #N+1, then the Eligible SCMA slot vector can be expressed as:

$P_{eligible}$ (frame #N)=[0 0 0 0 0 0 0 0 0 0 T T T T T T T 0 0 0 0 0 0 0 0].

Where "0" represents an eligible SCMA slot and "T" the "blocked SCMA slot" due to in-frame TDMA burst(s), including the frequency switching time. If a TDMA burst starts at the beginning of frame N+1, there would be 51.2 inroute slots (3 ms) gap for switching, and the vector would be expressed as:

$P_{eligible}$(frame#N)=[0 0 0 0 0 0 0 0 0 0 T T T T T T T 0 0 0 0 0 B B], where "B" represents "blocked SCMA slot" in frame N due to a TDMA burst in frame N+1. According to at least one embodiment, if the location of the TDMA burst in frame N+1 cannot be seen at the time of scheduling frame N, the last two SCMA slots in frame N are blocked for precaution.

The number of available SCMA slots available to carry data can be determined, according to an embodiment, based on the maximum number of SCMA slots per frame and the operating probability provided by the gateway. According to one implementation, a uniformly distributed random number (between 0 and 1) can be compared with the operating probability for each of the maximum allowed SCMA slots in a frame. As previously discussed, the maximum number of allowed SCMA slots in one exemplary embodiment can be 25. If the random number is less than, or equal to, the operating probability of an SCMA slot, then the SCMA slot is counted. If the random number is greater than the operating probability of an SCMA slot, then the SCMA slot is ignored. The counted SCMA slots are then totaled in order to determine the allowed SCMA slots in the frame. The number of available SCMA slots would then be the smaller one between the allowed and the eligible SCMA slots.

According to another implementation, the number of allowed SCMA slots ($L_1$) is set equal to (the maximum number of SCMA slots)*(operating probability).

Let Rounding Fraction=$L_1$−floor($L_1$), where floor($L_1$) means rounding down to the closest integer. A uniformly distributed random number (between 0 and 1) can be compared with the the Rounding Fraction. If the random number is less than, or equal to, the Rounding Fraction, set $L_{rounding}$=1; otherwise, set $L_{rounding}$=0. The number of available SCMA slots ($L_{avail}$) can be determined as:

$L_{avail}$=min[$E_{eligible}$,floor($L_1$)+$L_{rounding}$]

Once the eligible SCMA slots have been identified, the scheduling unit must determine which will be used for de-queueing data. When de-queueing data into the scheduled SCMA slots, the de-queueing unit needs the equivalent of one SCMA slot of time for changing UW words for a new SCMA group burst. This requires that the scheduling unit assign some spare SCMA slots so that the de-queueing unit can continue de-queueing the data until the number of scheduled SCMA slots is reached. The number of spare SCMA slots could be up to the total amount of unused Eligible SCMA slots.

According to at least one embodiment, the total number of spare SCMA slots can be determined as follows. Suppose the average packet size in unit of SCMA bursts of the expedited queue is known. Then the average number of spare SCMA slots needed can be determined by using the number of available SCMA slots to divide the average packet size. The average packet size of the expedited queue can be inferred as a function of BurstER, since the BurstER limits the maximum packet size during en-queueing operation. Thus, the number of spare SCMA slots can be determined. Since non-PBP packets can be en-queued with higher BurstER, the average non-PBP packet size (in SCMA bursts) is applied.

Denote $K_{non-PBP}$(BurstER) as the upper limit of a packet size in SCMA bursts. Let $u*K_{non-PBP}$ be the average non-PBP packet size, where u is a configurable parameter assigned a default value of 0.5. The number of spare SCMA slots, $L_{spare}$, can be determined by:

$$L_{spare} = \min\left[E_{eligible} - L_{avail}, \text{Ceil}\left(\frac{L_{avail}}{u \cdot K_{non-PBP}}\right)\right],$$

where $E_{eligible}$−$L_{avail}$ represents the number of unscheduled SCMA slots. The total number of SCMA slots scheduled as transmission opportunities in the next frame, $L_{scheduled}$, depends on how the group burst size is determined. According to an embodiment, if the group burst size is determined by the de-queueing unit, the spare SCMA slots are needed. The number of scheduled SCMA slots is given by $L_{scheduled}=L_{avail}+L_{spare}$.

If the scheduling unit determines the group burst size, the spare SCMA slots are not needed. Thus, number of scheduled SCMA slots would be given by $L_{scheduled}=L_{avail}$.

Figure 8:
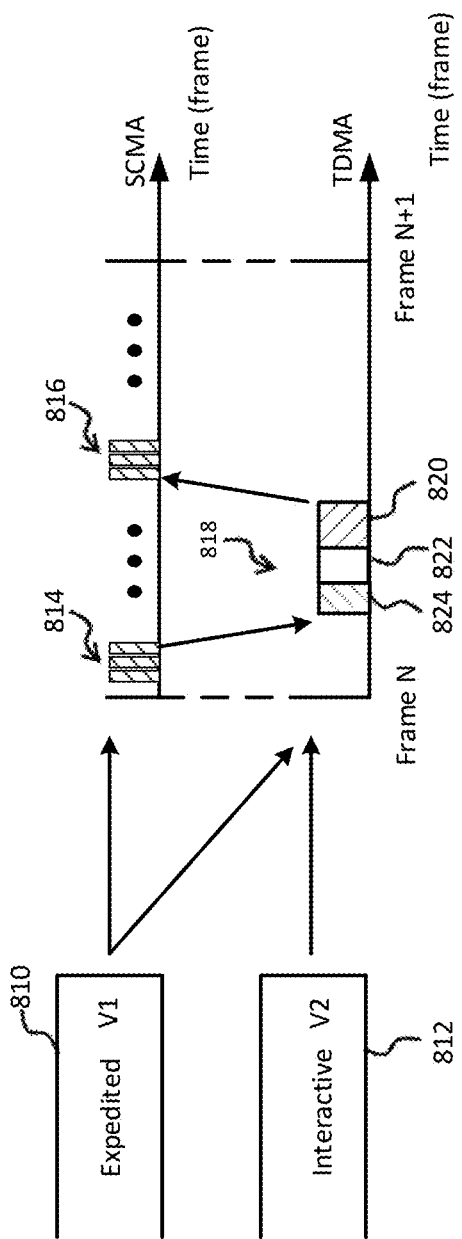
FIG. 8 is a diagram illustrating scheduling and de-queuing of traffic from multiple queues onto different channel frequencies, according to one or more embodiments.

FIG. 8 is a diagram illustrating scheduling and de-queuing of traffic from multiple queues onto different channel frequencies, according to one or more embodiments. Two of the output queues are also illustrated, namely the expedited queue 810 and the interactive queue 812. Given both TDMA and SCMA transmission opportunities, scheduled SCMA slots (814, 816) must be judiciously allocated for efficiently de-queueing data from the expedited queue 810. According to an embodiment, at least two criteria can be applied for de-queueing data from the expedited queue. First, allocated TDMA inroute slots should not be wasted. Thus, if both TDMA and SCMA slots are available in a same frame, the terminal always uses the TDMA slots first. SCMA slots are used after the TDMA slots have been filled to capacity. Second, SCMA slots are primarily for expedited data, except for very specific conditions where expedited data is not available.

As previously discussed, various aspects of the scheduling/de-queueing operations can be performed by either the scheduling unit or the de-queueing unit, depending on the specific implementation. For example, the de-queueing unit can determine whether to use an SCMA slot at run-time as it knows the expedited queue size and the location of TDMA burst(s). Accordingly, the de-queueing unit can be configured to apply the aforementioned criteria because the de-queueing can capture the in-frame arriving packets. According to other implementations, the de-queueing unit can be configured operate in a pipeline mode such that it fills every scheduled opportunities as long as there is data in the expedited queue. In such implementations, the scheduling unit can be configured to apply the aforementioned criteria.

The scheduling unit would, therefore, read the size of all output queues and determine where to locate the scheduled SCMA slots.

According to various embodiments, each terminal receives the position of its assigned TDMA burst for a future frame. FIG. 8 illustrates such a TDMA burst 818. The terminals also receive congestion control feedback from the gateway. The terminals utilize the congestion control feedback, in part, to determine which SCMA slots to use in current and future frames. The scheduling unit schedules the available SCMA slots for the de-queueing unit. The scheduling unit also pre-calculates the timing and size of the TDMA burst 818. Subject to the backlog in the expedited queue, the de-queueing unit can make immediate use of scheduled SCMA slots in the current frame for the en-queued data, or for packets which arrive during the current frame. For the allocated TDMA burst 818, the gateway does not indicate what amount is for which priority. Each terminal makes its own decision based on priority and pre-assigned weights for priority queues including CBR (Constant Bit Rate service), interactive, streaming, bulk, etc. For example, a first portion 820 of the TDMA burst 818 can carry expedited and interactive data. If this data does not occupy the entire TDMA burst 818, a second portion 822 can carry streaming data. A third portion 824 would carry bulk data.

As previously discussed, traffic in the expedited queue 810 can use both the SCMA and TDMA channels. Specifically, the data from the expedited queue 810 has exclusive priority to use any available SCMA opportunities. The expedited queue also shares the interactive TDMA slot allocation with interactive traffic (i.e., interactive queue 812) using a pre-defined weight. According to the embodiment illustrated in FIG. 8, the expedited queue 810 and interactive queue 812 have volumes (in bytes) represented by $V_1$ and $V_2$, respectively, that are measured at scheduling time. According to a specific implementation, pre-defined weights for sharing interactive TDMA slots by the expedited queue 810 and interactive queue 812 are $h_1=0.5$ and $h_2=0.5$, respectively.

In order to randomize transmission, the scheduling unit must determine where to locate the scheduled SCMA bursts (slots), i.e., scheduling them from the eligible SCMA slots. According to an embodiment, different scheduling procedures can be applied, namely random scheduling and backward scheduling. The scheduling procedure can be selected based, at least in part, on the total backlog ($V_{total}$) of all priority queues (including CBR), and the capacity (in bytes) of the current TDMA burst ($C_{TDMA}$). If $C_{TDMA}<V_{total}$, then random scheduling is applied. Otherwise, backward scheduling is applied.

As previously discussed, eligible SCMA slots may be present before and/or after an assigned TDMA burst (i.e., SCMA slots E1, E2, etc.). According to an embodiment, eligible SCMA slots can be grouped consecutively. According to another embodiment, eligible SCMA slots can be randomized within the frame for scheduling.

If at least one TDMA burst exists with the two largest SCMA eligible intervals E1 and E2, and E1≥$L_{scheduled}$ and E2≥$L_{scheduled}$, then the scheduling unit randomly locates the available number of SCMA slots ($L_{scheduled}$) as a consecutive burst group, either in E1 or in E2. This can be done, for example, probabilistically to their relative size. According to a specific implementation, set $$p_1 = \frac{E1}{E1+E2} \text{ and } p_2 = 1 - p_1.$$

Next, run a uniformly distributed random number p, where p is between 0 and 1. If p≤$p_1$, then the scheduling unit places $L_{scheduled}$ in E1. Otherwise, the scheduling unit places $L_{scheduled}$ in E2. Next, the location of $L_{scheduled}$ is randomized as a group in the selected eligible SCMA slots.

For example, let E1=10, E2=8, and $L_{scheduled}$=4. It can be seen that both E1 and E2 are greater than or equal to $L_{scheduled}$. The following vector can be constructed to represent the location of eligible SCMA slots:

$P_{eligible}$=[0 0 0 0 0 0 0 0 0 0 T T T T T T T 0 0 0 0 0 0 0 0].

The vector contains 25 entries corresponding to the 25 slot positions in the frame. E1 represents the first ten zeroes, meaning ten eligible SCMA slots. Similarly, E2 represents the last eight zeroes. The seven "T"s in the middle represent TDMA overlapped positions. Next, $p_1$ is calculated as follows:

$$p_1 = \frac{10}{10+8} = \frac{5}{9}.$$

If a random number is obtained as p=0.4<$p_1$, then $L_{avail}$ is allocated in E1. The possible starting position are from 1 to (E1-$L_{avail}$+1), i.e., from 1 to 7. Randomly selecting a number, say 4, causes $L_{avail}$ to be located from the SCMA slots 4 to 7. The following vector can also be generated to represent the scheduled position:

$P_{scheduled}$=[0 0 0 1 1 1 1 0 0 0 T T T T T T T 0 0 0 0 0 0 0 0].

Here "0" represents the eligible SCMA slots, "1" the scheduled SCMA slots, and "T" the blocked SCMA slots due to TDMA. If the random selection goes to E2, then $L_{scheduled}$ is randomly located in E2.

If E1<$L_{scheduled}$ or E2<$L_{scheduled}$, regardless of the existence of a TDMA, then the scheduling unit randomly locates the scheduled number of SCMA slots $P_{scheduled}$ as a consecutive burst group as much as possible, skipping gaps due to TDMA burst(s). For example, let E1=10, E2=10, and $L_{scheduled}$=11. The following vector can be used to represent the location of eligible SCMA slots:

$P_{eligible}$=[0 0 0 0 0 0 0 0 0 0 T T T T T 0 0 0 0 0 0 0 0 0 0].

The starting position of the scheduled SCMA slot is between the first eligible SCMA slot to the eligible SCMA slot that is determined by E1+E2-$L_{scheduled}$+1. Note the sequence of SCMA slots is of the eligible slots, not the regular SCMA slots. In this example, the first eligible SCMA slot is regular SCMA slot #1. The eligible SCMA slot of E1+E2-$L_{scheduled}$+1 (i.e., 10+10-11+1=10) is eligible SCMA slot #10. Randomly select a number between SCMA slot #1 and SCMA slot #10, say 4. Starting from eligible SCMA slot #4, available SCMA slots are used for $L_{scheduled}$ until eligible SCMA slot #(4+$L_{scheduled}$-1)=(4+11-1)=14. The vector of scheduled positions can be written as:

$P_{scheduled}$=[0 0 0 1 1 1 1 1 1 1 T T T T T 1 1 1 1 0 0 0 0 0 0].

In terms of eligible SCMA slots, the scheduled SCMA slot numbers are #4 to #14. In terms of regular SCMA slots, the scheduled SCMA slot numbers are #4 to #10, and #16 to #19. This results in two SCMA burst groups with consecutive SCMA slots, one with 7 burst positions before the assigned TDMA burst position, and the other with 4 burst positions after the assigned TDMA burst position.

According to an embodiment, if the total amount of data in all of the output queues is less than the total capacity (bytes) of the TDMA burst for the incoming frame, the scheduling unit applies Backward Scheduling as described below. The SCMA slots are scheduled based on the number of eligible SCMA slots($E_{eligible}$) and the number of scheduled SCMA slots($L_{scheduled}$).

If $L_{scheduled} \leq \text{floor}(\frac{1}{2} \cdot E_{eligible})$ the scheduling unit assigns $L_{scheduled}$ in the second half of $E_{eligible}$ (not the second half of the frame). Alternatively, if $L_{scheduled} > \text{floor}(\frac{1}{2} \cdot E_{eligible})$.

then the scheduling unit assigns $L_{scheduled}$ in the full range of $E_{eligible}$. For example, let $E_{eligible}$=18 and $L_{scheduled}$=8, and the following vector of eligible SCMA slots:

$P_{eligible}$ (frame #N)=[0 0 0 0 0 0 0 0 0 T T T T T T 0 0 0 0 0 0 0 0].

Since $L_{scheduled} \leq \text{floor}(\frac{1}{2} \cdot E_{eligible})$ (i.e., 8<9), $L_{scheduled}$ is randomly assigned to the second half of $E_{eligible}$. The second half of $E_{eligible}$ has 9 SCMA slots, marked as eligible SCMA slots #10 to #18. The starting position would be eligible slots #10 to #11 such that at least 8 SCMA slots can be assigned. Randomly select slot #10, for example. Then $L_{scheduled}$ will be assigned in eligible SCMA slots #10 to #17. This assignment is then mapped to regular SCMA slots #10 and #18 to #24. The vector of scheduled positions then becomes:

$P_{scheduled}$ (frame #N)=[0 0 0 0 0 0 0 0 1 T T T T T T T 1 1 1 1 1 1 1 0].

If the start position is selected to be SCMA slot #10, however, the scheduled SCMA slots would be from #18 to #25. The vector of scheduled positions would then become:

$P_{scheduled}$ (frame#N)=[0 0 0 0 0 0 0 0 0 T T T T T T 1 1 1 1 1 1 1 1 1].

Once the scheduling unit has determined the available SCMA slots that will be used, the data from the various output queues must be de-queued onto the SCMA and/or TDMA transmission opportunities. According to one or more embodiments, group bursts can be used to de-queue data from the output queues. As used herein, an internet protocol (IP) packet is referred to as an IPE packet, and a MAC layer packet as IBE packet. In embodiments where the scheduling unit determines the group burst size, the group burst may be large enough to accommodate multiple IPE packets, or not enough to accommodate even one IPE packet. A group burst can consist of a consecutive number of SCMA bursts with a same UW word, and sized to fit an entire IBE packet. The group burst size (GBS), in SCMA slots, is provided in the first SCMA burst of each group burst.

In TDMA, an IBE packet is constructed to fit the PHY burst size. Thus, one IBE packet may contain multiple IPE packets or even a partial IPE packet, subject to the PHY burst size and the IPE packet size. The bytes contained in a IBE packet would be the same as the information bytes potentially carried by the allocated TDMA PHY burst. In SCMA, however, the group burst maintains the same concept as the PHY burst in TDMA. Thus, one group burst carries one IBE packet, which may contain a partial, whole, or multiple IPE packets. Due to network congestion, the number of SCMA bursts that can be transmitted in one 45 ms frame may vary from 0 up to 25.

According to at least one embodiment, the group burst size can be determined as follows. Let $C_{TDMA,data}$ (in bytes) be the TDMA capacity in an incoming frame, $V_{Expd}$ the expedited data (in bytes) in the expedited queue, and $V_{non\text{-}Expd}$ the total non-expedited data (in bytes). Denote $B_{SCMA}$ as the burst size (78 bytes in the continuing example embodiment), and $GBS_0$ the default group burst size (in number of SCMA slots). There can be several group bursts in a frame. Denote $GBS_{PL}$ as the group burst size based on the expedited payload and $GBS_{Inst}$ as the instantaneously formed group burst size in a frame.

Starting from the beginning of the scheduled SCMA slots, a group burst is formed based on the payload and instantaneously determined group burst Size, given by:

$$GBS_{PL}(k) = \max\left[GBS_0, \text{roundup}\left\{\max\left[0, \left\lceil\frac{V_{expd} - \max(0, C_{TDMA} - V_{non\text{-}Expd})}{B_{SCMA}}\right\rceil - \sum_{j=0}^{k-1} GBS_{Inst}(j)\right]\right\}\right],$$

where:

$GBS_{Inst}(k) = \min[GBS_{PL}(k), S_{rest}, GBSL, I_{max\text{-}GBS}]$, $S_{rest}$ is the rest of the consecutive SCMA slots based on the first SCMA slot of this group burst, and k is the counter of the number of group bursts in the corresponding frame, k=1, . . . , K. K is the total number of group bursts formed in the frame subject to conditions. For the expression purpose, $GBS_{Inst}(0)$=0.

The procedure continues until either $L_{scheduled}$ or $L_{avail}$, whichever is reached first, meaning the sum of group burst size reaches $L_{avail}$ or the sum of group burst size plus the group burst gaps reaches $L_{scheduled}$. If a terminal is idle and there is data in the expedited queue, the scheduling unit uses the same procedure. If a terminal is idle and there is no data in the expedited queue, the scheduling unit generates a group burst with only one SCMA slot.

Figure 9A:
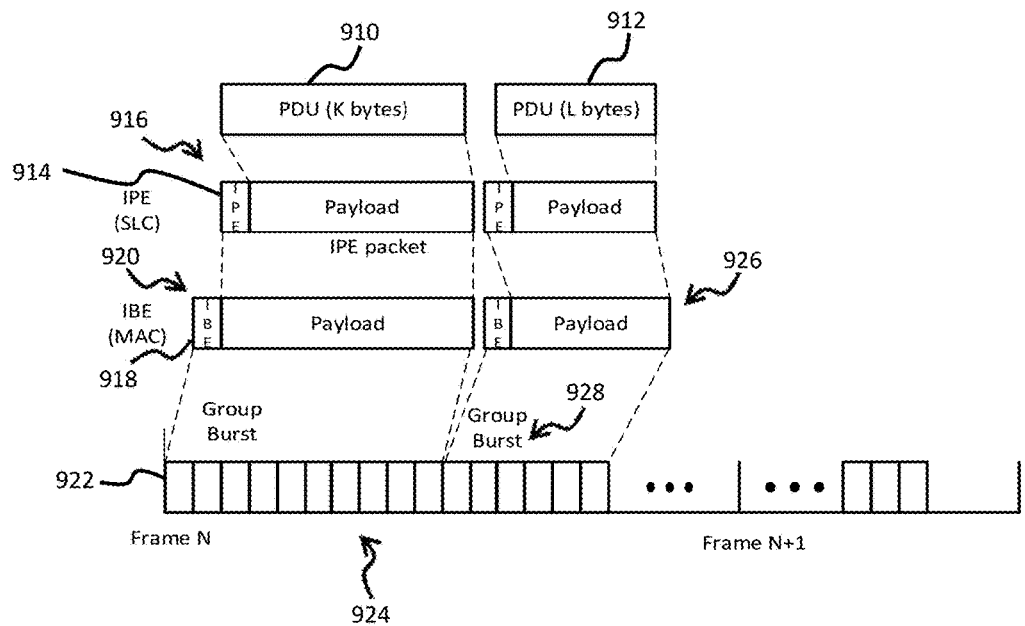
FIG. 9A is a diagram illustrating de-queueing of a PDU payload that is less than or equal to an SCMA burst, according to one embodiment.

FIG. 9A is a diagram illustrating de-queueing of a protocol data unit (PDU) payload that is less than or equal to an SCMA burst, according to one embodiment. As previously discussed, the SCMA group burst can be formed by either the scheduling unit or de-queueing unit, depending on the actual implementation. FIG. 9A illustrates a first PDU payload 910 and a second PDU payload 912. The first PDU payload 910 is encapsulated with an IPE header 916 to form an IPE packet 916. At the MAC layer, the IPE packet 916 is encapsulated with an IBE header 918 to form an IBE packet 920. As illustrated in FIG. 9A, the size of the IBE packet 920 is less than the available SCMA slots 922. Thus, the entire IBE packet 920 is de-queued via a first SCMA group burst 924 which occupies the first ten (10) available SCMA slots 922. The second PDU payload 912 is also encapsulated into a second IBE packet 926 and de-queued via a second SCMA group burst 928 which occupies the next six (6) available SCMA slots 922.

Figure 9B:
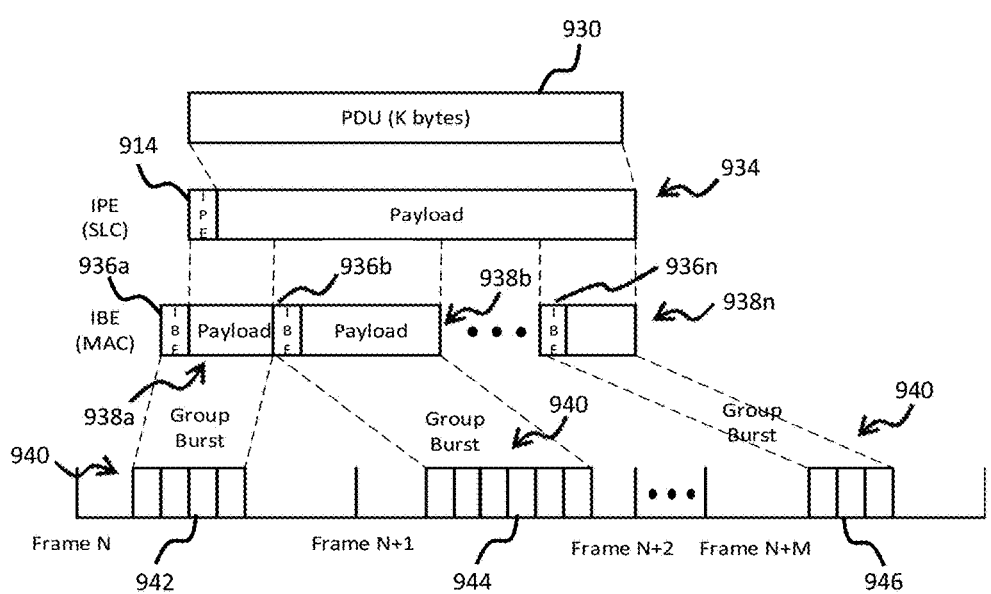
FIG. 9B is a diagram illustrating de-queueing of a PDU payload that is greater than an SCMA burst, according to another embodiment.

FIG. 9B is a diagram illustrating de-queueing of a PDU payload 930 that is greater than an SCMA burst, according to another embodiment. The PDU payload 930 is encapsulated with IPE header 932 to form an IPE packet 934. The IPE packet 934 is divided into segments (a . . . n) at the MAC layer. The first IPE segment is encapsulated with a first IBE header 936a to form a first IBE packet 938a. Similarly, the second IPE segment is encapsulated with a second IBE header 936b to form a second IBE packet 938b. The MAC layer continues encapsulating all segments of the IPE packet until the final segment is encapsulated with a final IBE header 936n to form a final IBE packet 938n. As illustrated in FIG. 9B, the IBE packets (938a-938n) exceed the size of the available SCMA slots 940. The first IBE packet 938*a* is de-queued via a first SCMA group burst 942, and the second IBE packet 938*b* is de-queued via a second SCMA group burst 944. The process continues until the final IBE packet 938*n* is de-queued via a final SCMA group burst 946. According to the illustrated embodiment, the SCMA group bursts (942-946) can occupy different numbers of available SCMA slots 940 due, at least in part, to the location and size of TDMA bursts. Additionally the PDU payload 930 can be transmitted across multiple frames, depending on its size and/or TDMA burst characteristics (e.g., size, location, etc.).

Figure 10:
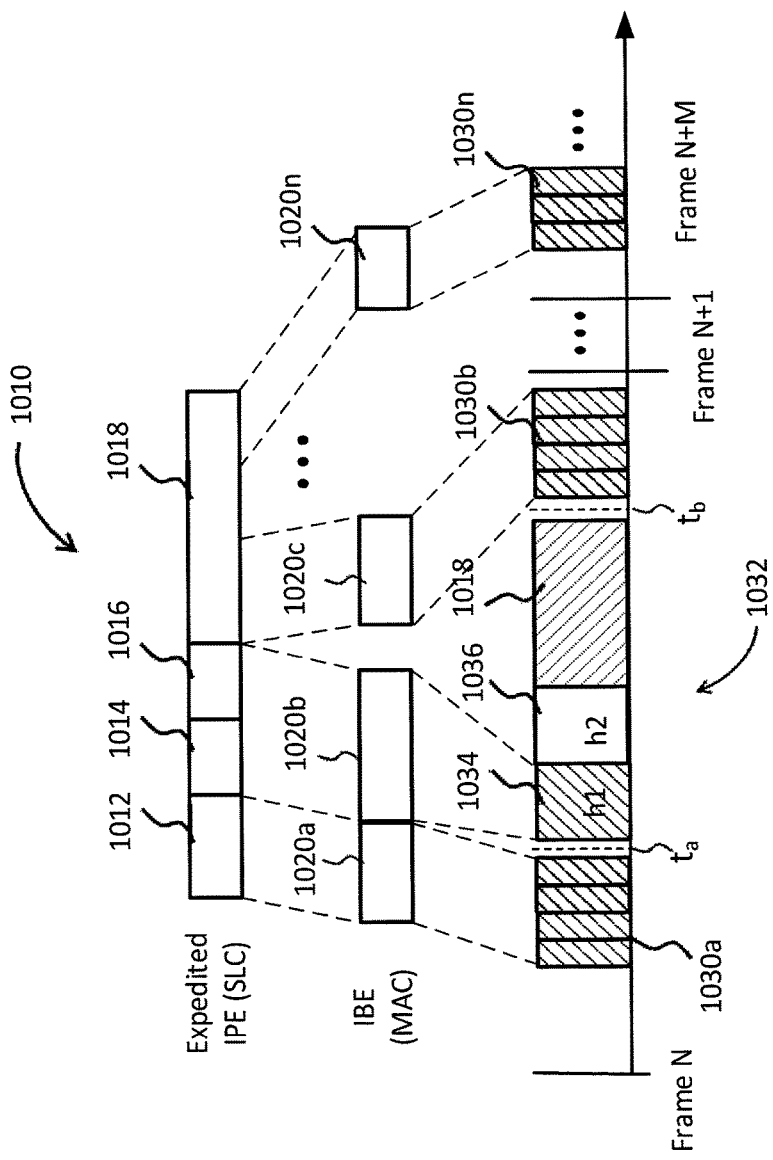
FIG. 10 is a diagram illustrating de-queueing of data from an expedited queue using SCMA and TDMA, according to one or more embodiments.

FIG. 10 is a diagram illustrating de-queueing of data from an expedited queue using both SCMA and TDMA transmission opportunities, according to one or more embodiments. The de-queueing unit can be configured to work in a pipeline mode such that it de-queues data from respective output queues whenever a transmission opportunity presents itself. The scheduling unit can be configured to inform the de-queueing unit of both TDMA and SCMA transmission opportunities for a future frame. According to an exemplary implementation, the scheduling unit does this about one half frame in advance. In the case of SCMA transmission opportunities, the scheduling unit informs the de-queueing unit of the scheduled group bursts in terms of SCMA slot positions.

As previously discussed, SCMA slots are used exclusively for the expedited queue, while a portion of TDMA burst can also be used for the expedited queue. Under limited circumstances, however, residual space in a group burst can be filled by non-expedited data. When generating the group bursts, the de-queueing unit uses the same UW for a same group burst. The de-queueing unit changes the UW for each different group burst, regardless of whether or not the de-queued data is from the same packet.

According to at least one embodiment, the de-queueing unit de-queues data for scheduled SCMA group bursts by first determining if the expedited queue contains any data. If the expedited queue contains data, the de-queueing unit fills a group burst with expedited data. If no data is present in the expedited queue, the de-queueing unit skips the current group burst. As illustrated in FIG. 10, the expedited queue contains expedited data 1010 in the form of a first IPE packet 1012, a second IPE packet 1014, a third IPE packet 1016, and a fourth IPE packet 1018. The IPE packets (1012-1018) are encapsulated at the MAC layer to form multiple IBE packets (1020*a*, 1020*b*, 1020*c*, . . . 1020*n*). Thus, the de-queueing unit would begin the process of filling the first SCMA group burst 1030*a* with the expedited data contained in the IBE packets 1020.

According to an embodiment, if there is residual room (in bytes) in an SCMA group burst, the residual room is filled either by padding or by lower priority traffic. This is done in order to fully utilize the capacity available in the SCMA group burst. According to a specific implementation, the lower priority traffic is selected in order from interactive to conventional (see FIG. 6). Additionally, the residual room in the SCMA group burst is filled regardless of the BurstER and operating probability.

The de-queueing unit can be configured, according to various embodiments, to de-queue data for TDMA transmission opportunities based, at least in part, on a weighted fairness criteria. Data from all link layer queues (e.g., CBR, expedited, interactive, streaming, bulk, and conventional) can be de-queued using TDMA transmission opportunities. The expedited queue shares the interactive TDMA slot allocation with interactive queue using a pre-defined weight. For example, the pre-defined weights for the expedited queue and interactive queue can be h1 and h2, respectively, when sharing interactive TDMA slots. According to a specific implementation, the default values can be set as h1=0.5 and h2=0.5. The weight of interactive TDMA slots is split based on h1 and h2, so that $$\frac{h_1}{h_1 + h_2} W_{INTE}$$

is defined for the expedited queue and $$\frac{h_2}{h_1 + h_2} W_{INTE}$$

is defined for the interactive queue, where $W_{INTE}$ is a pre-assigned weight for interactive TDMA slots.

Next, the de-queueing unit proceeds to first de-queue CBR data. The bandwidth for the expedited queue is then calculated. According to an embodiment, the total TDMA capacity available for the expedited queue can be determined by $$C_{TDMA,Expd} = \text{Max}\left[C_{TDMA,data} \cdot \frac{h_1}{h_1 + h_2} W_{INTE}, C_{TDMA,data} - V_{non-Expd}\right]$$

where:

$C_{TDMA}$, data is the capacity in bytes of the current TDMA burst excluding those for CBR, $V_{non-Expd}$ is the total instant queued data of the interactive, streaming, bulk, and conventional queues, and $W_{Streaming}$, $W_{Bulk}$, and $W_{Conv}$ are weights for the streaming, bulk, and conventional queues, respectively.

Once the expedited data has been de-queued, the de-queueing unit processes the remaining output queues using a fairness criteria similar to that previously described for the expedited queue.

As illustrated in FIG. 10, SCMA group bursts are formed using the available SCMA slots located before (1030*a*) and after (1030*b*, 1030*n*) the TDMA burst. Prior to the TDMA burst 1032, a first interval $t_a$ is inserted for switching the channel frequency. Similarly, a second interval $t_b$ is inserted after the TDMA burst 1032. A corresponding portion 1034 of the TDMA burst 1032 is also used for the expedited data. According to the illustrated embodiment, IBE packets de-queued by a TDMA burst can carry a partial or multiple IPE packets. IBE packets de-queued via an SCMA group burst can also carry partial, whole, or multiple IPE packets. However, the residual space of a SCMA group burst may be filled by padding or data from other priority queues. The TDMA burst 1032 also includes a portion 1036 which carries interactive data, and a portion 1038 which carries other types of traffic.

Figure 11:
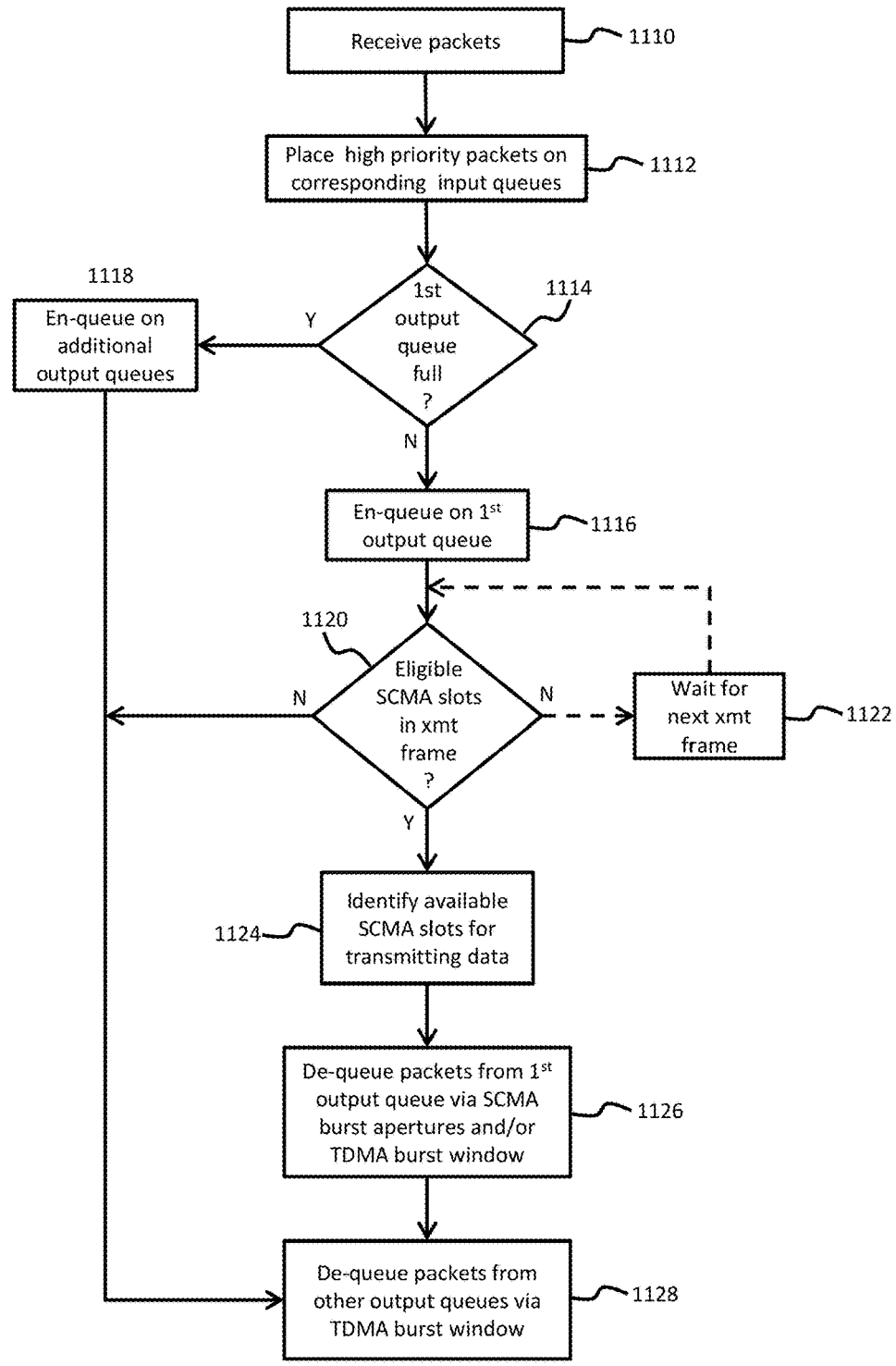
FIG. 11 is a flowchart of a process for scheduling prioritized traffic in an SCMA system, according to one embodiment.

FIG. 11 is a flowchart of a process for scheduling prioritized traffic in an SCMA system, according to one embodiment. At 1110 packets are received at the terminal from the various user devices. As previously discussed, the packets can be received via wired or wireless connections through the terminal's communication unit. At 1112, high priority packets are placed on corresponding input queues. As previously discussed, the first input queue 612 and second input queue 620 (FIG. 6) can include sub-queues having different priorities. For example, spoofed TCP traffic requiring specialized processing can be placed on a specialized, or high priority, queue (e.g., sub-queue 614), whereas packets which do not require specialized processing can be placed on sub-queues having lower priorities (e.g., priority 2 . . . priority N). According to at least one embodiment, the received packets are placed on the input queues based, at least in part, on processing performed by the CPU.

At 1114, the first output queue is examined to determine whether or not it is full. If the first output queue is not full, then packets from the input queues are en-queued on the first output queue at 1116. If the first output queue is determined to be full, then at 1118, packets from the input queues are en-queued on additional output queues. According to at least one embodiment, the en-queueing unit can be configured to determine the status of the first output queue and determine whether received packets should be en-queued on the first output queue or the additional output queues. According to other embodiments, the CPU can be configured to perform these operations.

At 1120, the current frame is examined in order to determine whether there are any eligible SCMA slots contained therein. If the frame does not contain eligible SCMA slots, then control passes to 1128. According to at least one embodiment, only SCMA slots are used to transmit packets. In such embodiments, control optionally passes to 1122 if the current frame does not contain eligible SCMA slots, and the next frame will be examined for eligible SCMA slots. At 1124, the eligible SCMA slots are examined in order to determine whether any are available SCMA slots that can be used for transmitting data contained in the received packets from the first output queue. At 1126, packets from the first output queue are de-queued onto the frame using SCMA bursts and/or the TDMA burst assigned to the terminal. At 1128, packets from the additional output queues are de-queued using at least a portion of the TDMA burst assigned to the terminal.

Figure 12A:
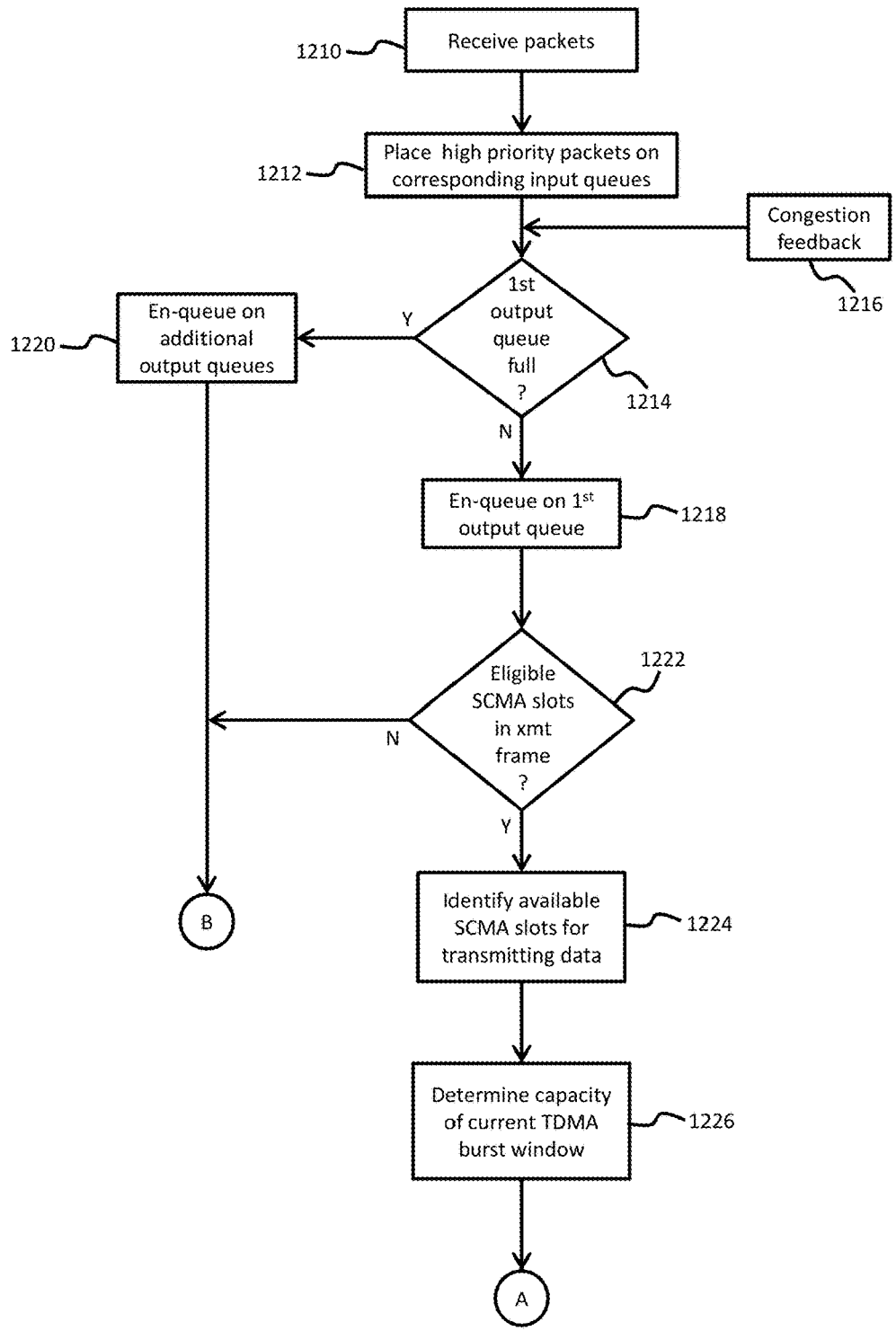
FIGS. 12A and 12B are a flowchart of a process for scheduling prioritized traffic in an SCMA system, according to another embodiment.
Figure 12B:
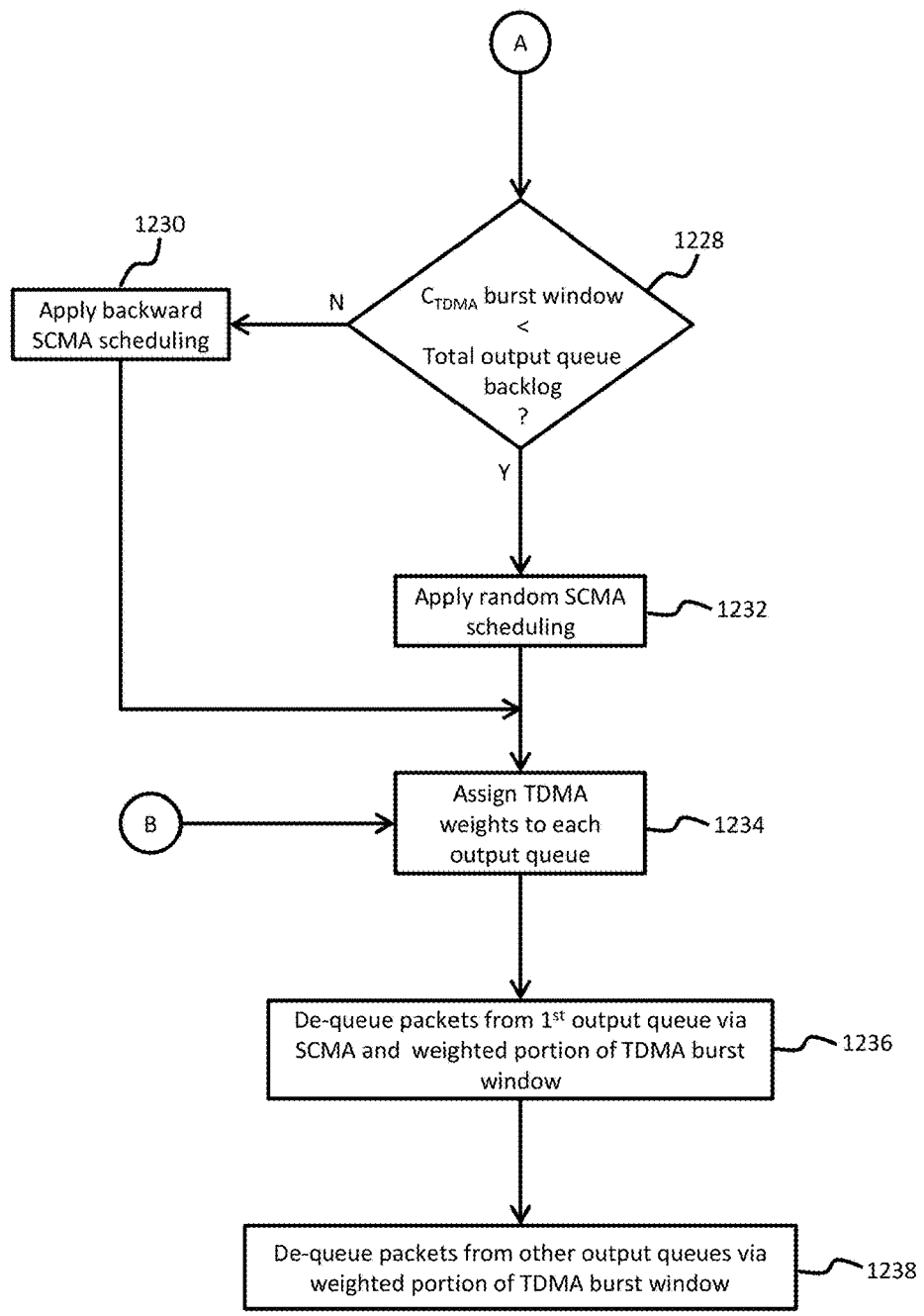

FIGS. 12A and 12B are a flowchart of a process for scheduling prioritized traffic in an SCMA system, according to another embodiment. At 1210, high priority packets are received from various user devices at each terminal. At 1212, the received packets are placed on high priority input queues. At 1214, the first output queue is examined to determine whether or not it is full. If the first output queue is not full, then packets from the high priority input queues are en-queued on the first output queue at 1218. If the first output queue is determined to be full, then packets from the high priority input queues are en-queued on additional output queues at 1220. Control then passes to 1234. According to at least one embodiment, the terminal can optionally receive congestion feedback information from the gateway to provide an indication of the total traffic conditions within the network. This is done at 1216. Thus, the en-queueing unit, or CPU, can utilize the congestion feedback information in order to assist in determining whether high priority packets are placed on the first output queue or the additional output queues. According to one or more embodiments, the additional output queues can include an interactive queue, a streaming queue, a bulk queue, and a conversational queue.

At 1222, the frame is examined in order to determine whether or not it contains eligible SCMA slots. If the frame contains eligible SCMA slots, they are examined at 1224 in order to identify if any qualify as available SCMA slots capable of being used to transmit data. If the frame does not contain any eligible SCMA slots, then control passes to 1234. At 1226, the capacity of the current TDMA burst is determined.

At 1228, the capacity of the TDMA burst is compared to the total output queue backlog. If the capacity of the TDMA burst is not less than the total output queue backlog, then control passes to 1230 where a backward scheduling procedure is applied. As previously discussed, scheduling of packets to be de-queued for transmission can be performed by either the scheduling unit or the CPU, depending on the specific embodiment. If the capacity of the TDMA burst is less than the total output queue backlog, then a random scheduling procedure is applied at 1232.

At 1234, different weights are assigned to packets contained in each of the output queues. More particularly, weights are assigned to the first output queue as well is the additional output queues. This can correspond, for example, to the situation where packets from the first output queue are de-queued using both SCMA and TDMA transmission opportunities. At 1236, packets from the first output queue are de-queued via SCMA and the weighted portion of the TDMA burst. At 1238, packets from the remaining output queues are de-queued based on their weighted portions of the TDMA burst.

Figure 13:
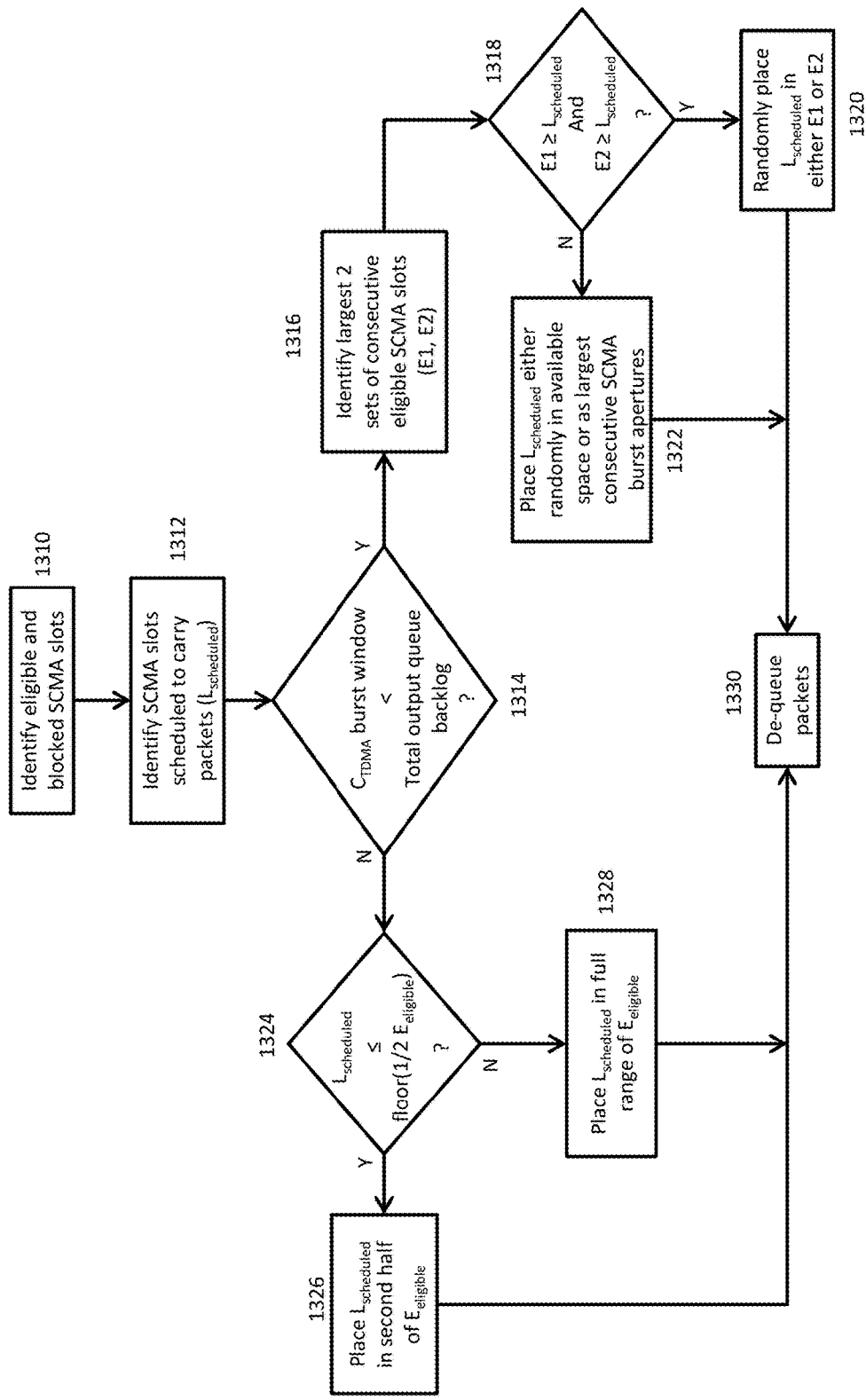
FIG. 13 is a flowchart of a process for selecting a scheduling method, according to at least one embodiment.

FIG. 13 is a flowchart illustrating the details for selecting the scheduling process, in accordance with at least one embodiment. At 1310, eligible and blocked SCMA slots within the frame are identified. At 1312, SCMA slots that are scheduled to carry packets are identified. At 1314, a determination is made to see if the capacity of the current TDMA burst is less than the total output queue backlog. If the capacity of the TDMA burst is less than the total output queue backlog, then the 2 largest sets of consecutive eligible SCMA slots (E1 and E2) are identified at 1316. At 1318, the 2 largest consecutive eligible SCMA slots (E1, E2) are compared to the size of the SCMA slots scheduled to carry packets. If both sets of consecutive eligible SCMA slots are greater than or equal to the SCMA slots scheduled to carry packets, then the SCMA slots scheduled to carry packets are randomly placed in either the first or second consecutive group of eligible SCMA slots. This is done at 1320. Otherwise, the SCMA slots scheduled to carry packets are either randomly placed in in available space (e.g., E1 and E2) or placed in available space based on the largest consecutive SCMA bursts at 1322. At 1330 the packets are de-queued, for example, via SCMA bursts.

Returning to the 1314, if the capacity of the TDMA burst is not less than the total output queue backlog, then control passes to 1324. If the size of the SCMA slots scheduled to carry packets is greater than or equal to the floor function of one half of the eligible SCMA slots, then the scheduled SCMA slots are placed in the second half of the eligible SCMA slots. Otherwise, the scheduled SCMA slots are placed in the full range of eligible SCMA slots. Control then passes to 1330 where the packets are de-queued.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
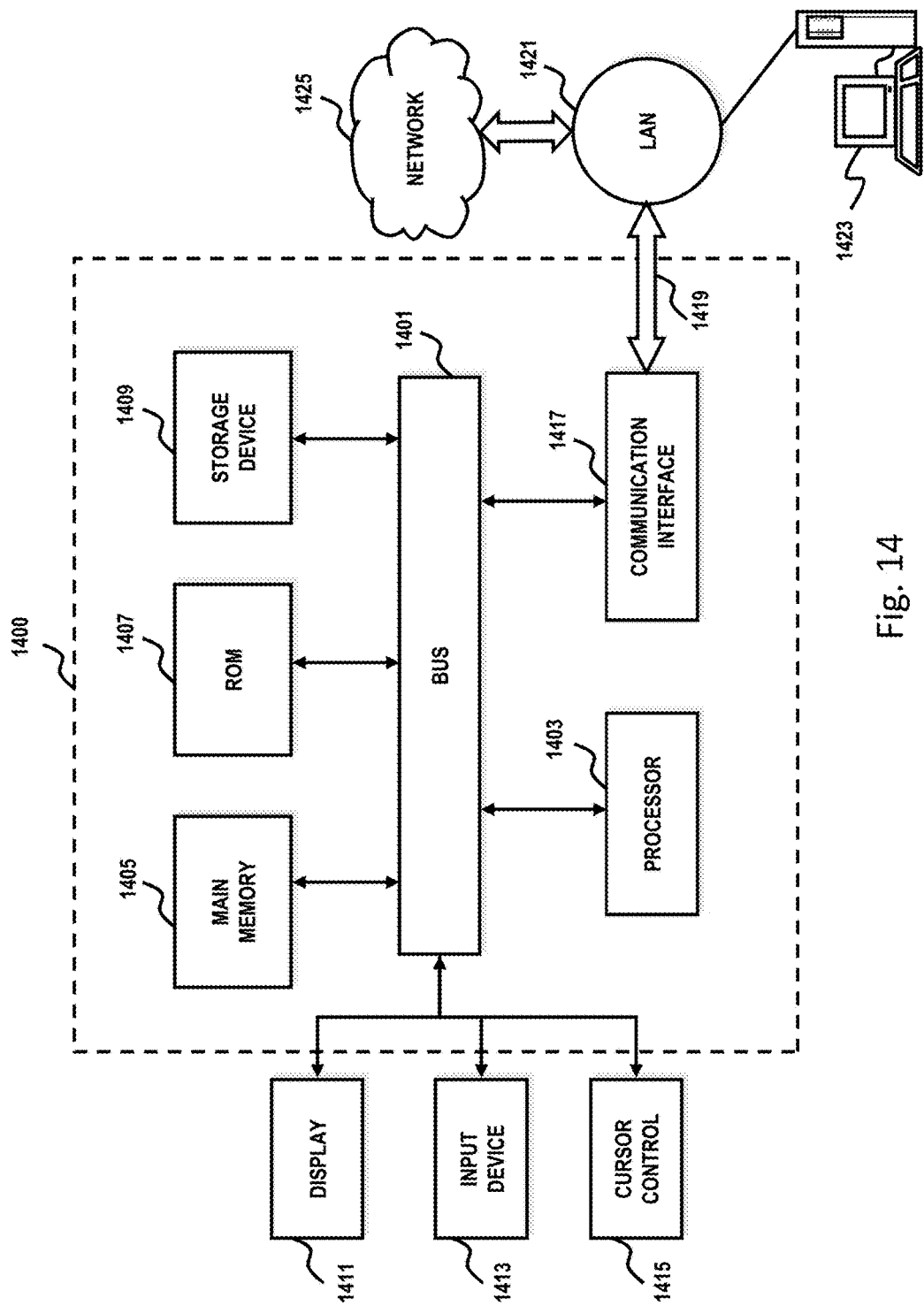
FIG. 14 is a diagram of a computer system that can be used to implement various exemplary embodiments.

FIG. 14 is a diagram of a computer system that can be used to implement various embodiments. The computer system 1400 includes a bus 1401 or other communication mechanism for communicating information and a processor 1403 coupled to the bus 1401 for processing information. The computer system 1400 also includes main memory 1405, such as a random access memory (RAM) or other dynamic storage device, coupled to the bus 1401 for storing information and instructions to be executed by the processor 1403. Main memory 1405 can also be used for storing temporary variables or other intermediate information during execution of instructions by the processor 1403. The computer system 1400 may further include a read only memory (ROM) 1407 or other static storage device coupled to the bus 1401 for storing static information and instructions for the processor 1403. A storage device 1409, such as a magnetic disk or optical disk, is coupled to the bus 1401 for persistently storing information and instructions.

The computer system 1400 may be coupled via the bus 1401 to a display 1411, such as a light emitting diode (LED) or other flat panel displays, for displaying information to a computer user. An input device 1413, such as a keyboard including alphanumeric and other keys, is coupled to the bus 1401 for communicating information and command selections to the processor 1403. Another type of user input device is a cursor control 1415, such as a mouse, a trackball, or cursor direction keys, for communicating direction information and command selections to the processor 1403 and for controlling cursor movement on the display 1411. Additionally, the display 1411 can be touch enabled (i.e., capacitive or resistive) in order facilitate user input via touch or gestures.

According to an exemplary embodiment, the processes described herein are performed by the computer system 1400, in response to the processor 1403 executing an arrangement of instructions contained in main memory 1405. Such instructions can be read into main memory 1405 from another computer-readable medium, such as the storage device 1409. Execution of the arrangement of instructions contained in main memory 1405 causes the processor 1403 to perform the process steps described herein. One or more processors in a multi-processing arrangement may also be employed to execute the instructions contained in main memory 1405. In alternative embodiments, hard-wired circuitry may be used in place of or in combination with software instructions to implement exemplary embodiments. Thus, exemplary embodiments are not limited to any specific combination of hardware circuitry and software.

The computer system 1400 also includes a communication interface 1417 coupled to bus 1401. The communication interface 1417 provides a two-way data communication coupling to a network link 1419 connected to a local network 1421. For example, the communication interface 1417 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1417 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1417 sends and receives electrical, electromagnetic, or optical signals that carry digital data streams representing various types of information. Further, the communication interface 1417 can include peripheral interface devices, such as a Universal Serial Bus (USB) interface, a High Definition Multimedia Interface (HDMI), etc. Although a single communication interface 1417 is depicted in FIG. 14, multiple communication interfaces can also be employed.

The network link 1419 typically provides data communication through one or more networks to other data devices. For example, the network link 1419 may provide a connection through local network 1421 to a host computer 1423, which has connectivity to a network 1425 such as a wide area network (WAN) or the Internet. The local network 1421 and the network 1425 both use electrical, electromagnetic, or optical signals to convey information and instructions. The signals through the various networks and the signals on the network link 1419 and through the communication interface 1417, which communicate digital data with the computer system 1400, are exemplary forms of carrier waves bearing the information and instructions.

The computer system 1400 can send messages and receive data, including program code, through the network(s), the network link 1419, and the communication interface 1417. In the Internet example, a server (not shown) might transmit requested code belonging to an application program for implementing an exemplary embodiment through the network 1425, the local network 1421 and the communication interface 1417. The processor 1403 may execute the transmitted code while being received and/or store the code in the storage device 1409, or other non-volatile storage for later execution. In this manner, the computer system 1000 may obtain application code in the form of a carrier wave.

The term "computer-readable medium" as used herein refers to any medium that participates in providing instructions to the processor 1403 for execution. Such a medium may take many forms, including but not limited to non-volatile media, volatile media, and transmission media. Non-volatile media include, for example, optical or magnetic disks, such as the storage device 1409. Non-volatile media can further include flash drives, USB drives, microSD cards, etc. Volatile media include dynamic memory, such as main memory 1405. Transmission media include coaxial cables, copper wire and fiber optics, including the wires that comprise the bus 1401. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 15:
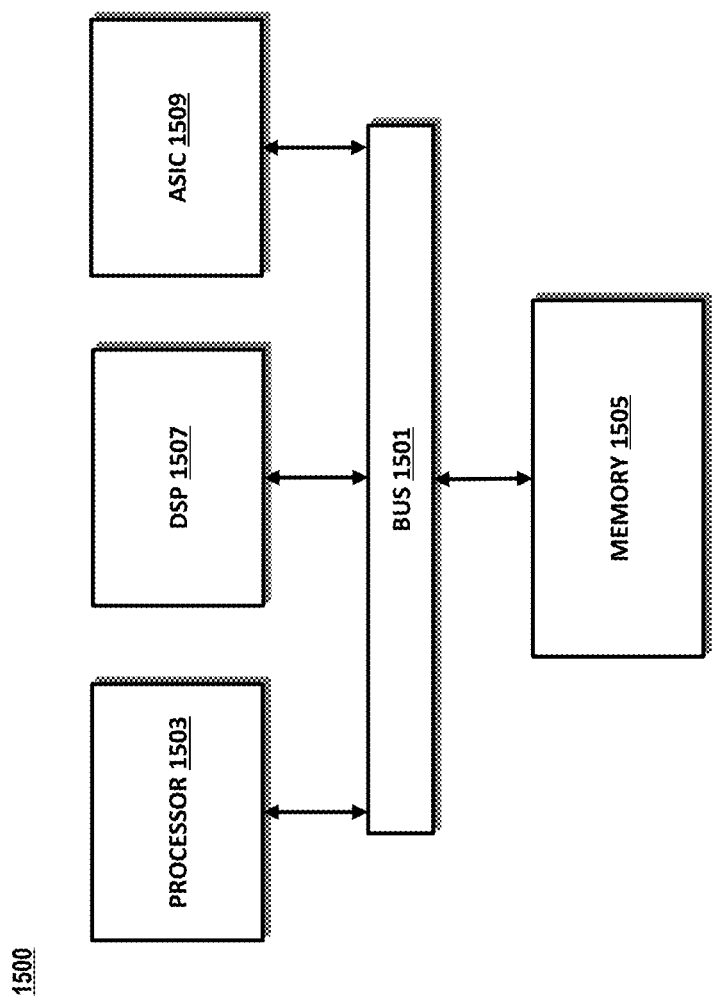
FIG. 15 is a diagram of a chip set that can be used to implement various exemplary embodiments.

FIG. 15 illustrates a chip set 1500 upon which an embodiment of the invention may be implemented. Chip set 1500 is programmed to implement various features as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of the figures.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1505 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    receiving packets, from one or more user devices, at a terminal;
    placing the packets on a first input queue and/or a second input queue;
    determining a priority and/or service class for each packet;
    en-queueing the packets onto a plurality of output queues including at least a first output queue and a second output queue based, at least in part, on the determined priority and/or service class;
    detecting one or more eligible scrambled and coded multiple access (SCMA) slots within a frame of a communication system;
    identifying available SCMA slots, from the eligible SCMA slots, that are useable for transmitting data; and
    de-queueing packets from the first output queue onto the frame via one or more SCMA bursts encompassing at least one available SCMA slot and/or via at least a portion of a Time Division Multiple Access (TDMA) burst assigned to the terminal,
    wherein the SCMA burst and TDMA burst are transmitted on different channel frequencies.

2. The method of claim 1, further comprising:
    receiving congestion feedback regarding traffic conditions on the communication system,
    wherein en-queueing the packets is performed based, at least in part, on the congestion feedback.

3. The method of claim 1, further comprising:
    de-queueing packets from the second output queue, and any additional queues from the plurality of output queues, onto the frame via at least a portion of the TDMA burst assigned to the terminal.

4. The method of claim 1, further comprising:
    selecting a first channel frequency prior to transmission of any SCMA bursts; and
    selecting a second channel frequency prior to transmission of any TDMA bursts.

5. The method of claim 1, wherein the plurality of output queues further comprises at least a streaming queue, a bulk queue, and/or a conversational queue.

6. The method of claim 1, wherein de-queueing comprises:
    scheduling transmission of packets from the first output queue via scheduled SCMA slots selected from at least one of the available SCMA slots; and
    de-queueing packets from the first output queue onto the frame via one or more SCMA burst encompassing the scheduled SCMA slots and/or at least a portion of the TDMA burst assigned to the terminal.

7. The method of claim 6, wherein the scheduling is performed based, at least in part, on the capacity of a current TDMA burst.

8. The method of claim 7, wherein the scheduling comprises:
    applying a random SCMA scheduling process to schedule transmission of packets from the first output queue via the scheduled SCMA slots, if the capacity of a current TDMA burst is less than a total backlog of all output queues; and
    applying a backward SCMA scheduling process to schedule transmission of packets from the first output queue via the scheduled SCMA slots, if the capacity of a current TDMA burst is greater than, or equal to, a total backlog of all output queues.

9. The method of claim 1, wherein:
    the first input queue and/or second input queue each comprise a plurality of sub-queues including at least a high priority sub-queue; and
    packets from the high priority sub-queues are en-queued onto the first output queue, or en-queued onto the second output queue if the first output queue is full.

10. An apparatus comprising:
    a communication unit configured, in part, to receive packets from one or more user devices, and place the packets on a first input queue and/or a second input queue;
    an en-queueing unit configured to:
        determine a priority and/or service class for each packet, and
        en-queue the packets onto a plurality of output queues based, at least in part, on the determined priority and/or service class,
        wherein the plurality of output queues include at least a first output queue and a second output queue;
    a scheduling unit configured to detect one or more eligible scrambled and coded multiple access (SCMA) slots within a frame of a communication system, and identify available SCMA slots, from the eligible SCMA slots, that are useable for transmitting data;
    a de-queueing unit configured to de-queue packets from the first output queue onto the frame via one or more SCMA bursts encompassing at least one available SCMA slot and/or via at least a portion of a Time Division Multiple Access (TDMA) burst assigned to the apparatus; and
    a transceiver for transmitting and receiving frames of the communication system,
    wherein the SCMA bursts and TDMA burst are transmitted on different channel frequencies.

11. The apparatus of claim 10, wherein the en-queueing unit is further configured to en-queue each packet based, at least in part, on congestion feedback regarding traffic conditions on the communication system.

12. The apparatus of claim 10, wherein the de-queueing unit is further configured to de-queue packets from the second output queue, and any additional queues from the plurality of output queues, onto the frame via at least a portion of the TDMA burst assigned to the apparatus.

13. The apparatus of claim 10, wherein the de-queueing unit is further configured to:
select a first channel frequency prior to transmission of any SCMA bursts; and
select a second channel frequency prior to transmission of any TDMA burst.

14. The apparatus of claim 10, wherein the plurality of output queues further comprises at least a streaming queue, a bulk queue, and/or a conversational queue.

15. The apparatus of claim 10, wherein:
the scheduling unit is further configured to schedule transmission of packets from the first output queue via scheduled SCMA slots selected from at least one of the available SCMA slots; and
the de-queueing unit is further configured to de-queue packets from the first output queue onto the frame via one or more SCMA bursts encompassing the scheduled SCMA slots and/or at least a portion of the TDMA burst assigned to the apparatus.

16. The apparatus of claim 15, wherein packets from the first output queue are scheduled for transmission based, at least in part, on the capacity of a current TDMA burst.

17. The apparatus of claim 15, wherein the scheduling unit is configured to:
apply a random scheduling process to schedule transmission of packets from the first output queue via the scheduled SCMA slots, if the capacity of a current TDMA burst is less than a total backlog of all output queues; and
apply a backward scheduling process to schedule transmission of packets from the first output queue via the scheduled SCMA slots, if the capacity of the current TDMA burst is greater than, or equal to, a total backlog of all output queues.

18. The apparatus of claim 10, wherein
the first input queue and/or second input queue each comprise a plurality of sub-queues including at least a high priority sub-queue; and
the en-queueing unit is configured to en-queue packets from the high priority sub-queues onto the first output queue, or onto the second output queue if the first output queue is full.

19. A system comprising:
one or more terminals, each terminal comprising:
a communication unit configured, in part, to receive packets from one or more user devices, and place the packets on a first input queue and/or a second input queue,
an en-queueing unit configured to:
determine a priority and/or service class for each packet, and
en-queue the packets onto a plurality of output queues based, at least in part, on the determined priority and/or service class,
wherein the plurality of output queues includes at least a first output queue and a second output queue,
a scheduling unit configured to detect one or more eligible SCMA slots within a frame of a communication system, and identify available SCMA slots, from the eligible scrambled and coded multiple access (SCMA) slots, that are useable for transmitting data,
a de-queueing unit configured to de-queue packets from the first output queue onto the frame via one or more SCMA bursts encompassing at least one available SCMA slot and/or via at least a portion of a Time Division Multiple Access (TDMA) burst assigned to the terminal, and
a transceiver for transmitting and receiving frames of the communication system; and
a gateway configured to transmit/receive frames to/from the one or more terminals, and to broadcast congestion feedback regarding traffic conditions on the communication system to the one or more terminals,
wherein the SCMA burst and TDMA burst are transmitted on different channel frequencies,
wherein TDMA bursts are assigned to the one or more terminals based, at least in part, on current demand, and
wherein each terminal autonomously transmits its SCMA bursts.

20. The system of claim 19, wherein:
the en-queueing unit is further configured to en-queue each packet based, at least in part, on congestion feedback regarding traffic conditions on the communication system; and
the de-queueing unit is further configured to de-queue packets from the second output queue, and any additional queues from the plurality of output queues, onto the frame via at least a portion of the TDMA burst assigned to the apparatus.

* * * * *